(12) United States Patent
Suzaki

(10) Patent No.: US 7,085,399 B2
(45) Date of Patent: Aug. 1, 2006

(54) WATERMARK INFORMATION EMBEDDING DEVICE AND WATERMARK INFORMATION DETECTION DEVICE

(75) Inventor: Masahiko Suzaki, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 182 days.

(21) Appl. No.: 10/462,764

(22) Filed: Jun. 17, 2003

(65) Prior Publication Data

US 2004/0052401 A1 Mar. 18, 2004

(30) Foreign Application Priority Data

Jun. 18, 2002 (JP) ............................. 2002-177086

(51) Int. Cl.
*G06K 9/00* (2006.01)
*G06K 9/34* (2006.01)
*G06K 15/00* (2006.01)

(52) U.S. Cl. .................. 382/100; 358/3.28; 382/176

(58) Field of Classification Search ................ 382/100; 358/3.28
See application file for complete search history.

(56) References Cited

U.S. PATENT DOCUMENTS

| | | | | |
|---|---|---|---|---|
| 5,892,843 A | * | 4/1999 | Zhou et al. | 382/176 |
| 5,946,414 A | * | 8/1999 | Cass et al. | 382/183 |
| 5,949,055 A | * | 9/1999 | Fleet et al. | 235/469 |
| 6,208,745 B1 | * | 3/2001 | Florencio et al. | 382/100 |
| 6,239,818 B1 | * | 5/2001 | Yoda | 347/43 |
| 6,354,630 B1 | * | 3/2002 | Zhang et al. | 283/70 |
| 6,473,196 B1 | * | 10/2002 | Usami et al. | 358/1.18 |
| 6,603,864 B1 | * | 8/2003 | Matsunoshita | 382/100 |
| 6,694,041 B1 | * | 2/2004 | Brunk | 382/100 |
| 6,763,121 B1 | * | 7/2004 | Shaked et al. | 382/100 |
| 6,798,906 B1 | * | 9/2004 | Kato | 382/176 |
| 6,813,367 B1 | * | 11/2004 | Bhattacharjya | 382/100 |
| 2001/0028727 A1 | * | 10/2001 | Naito et al. | 382/100 |
| 2001/0030761 A1 | * | 10/2001 | Ideyama | 358/1.9 |
| 2002/0054356 A1 | * | 5/2002 | Kurita et al. | 358/3.28 |
| 2002/0105679 A1 | * | 8/2002 | Haynes | 358/3.28 |
| 2002/0180995 A1 | * | 12/2002 | Yen et al. | 358/1.9 |
| 2003/0026450 A1 | * | 2/2003 | Powell et al. | 382/100 |

FOREIGN PATENT DOCUMENTS

| | | |
|---|---|---|
| JP | 9-179494 | 7/1997 |
| JP | 10-200743 | 7/1998 |
| JP | 2001-53954 | 2/2001 |
| JP | 2001-78006 | 3/2001 |

* cited by examiner

*Primary Examiner*—Bhavesh M. Mehta
*Assistant Examiner*—Anthony Mackowey
(74) *Attorney, Agent, or Firm*—Rabin & Berdo, P.C.

(57) ABSTRACT

There are provided a watermark information embedding device and a watermark information detection device which can correctly extract classified information. In the watermark information embedding device, a plurality of dot patterns the wave directions and/or wavelengths of which are changed depending on dot arrangements are prepared, one symbol is given to one of the dot patterns, and the dot patterns are combined and arranged, so that the classified information is given. The watermark information detection device includes two-dimensional wavelet filters the number of which is equal to the number of dot patterns and which have the same wave directions and the same wavelengths as those of the dot patterns. Convolutions between an arbitrary region in a watermarked image and the plurality of two-dimensional wavelet filters are calculated, and it is determined that the dot pattern corresponding to the two-dimensional wavelet filter having the maximum convolution is embedded in the region.

4 Claims, 31 Drawing Sheets

FIG.3
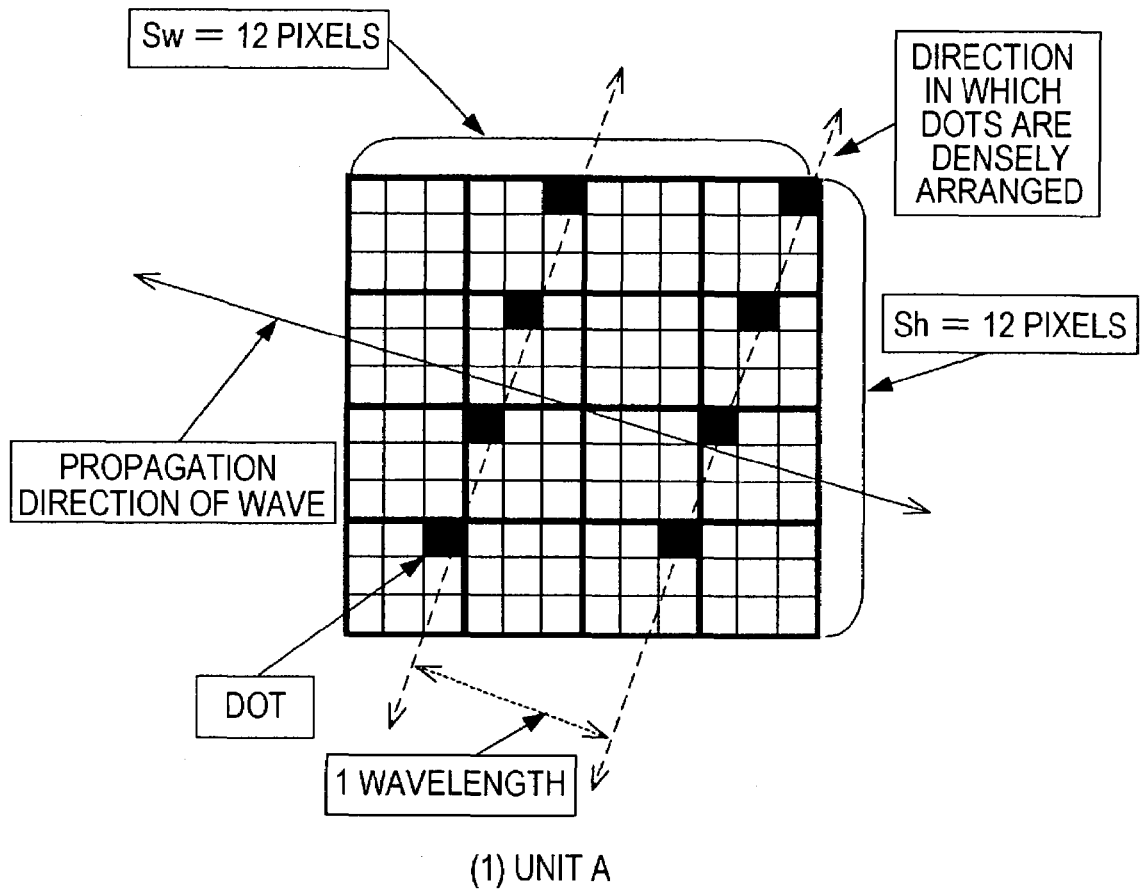
(1) UNIT A
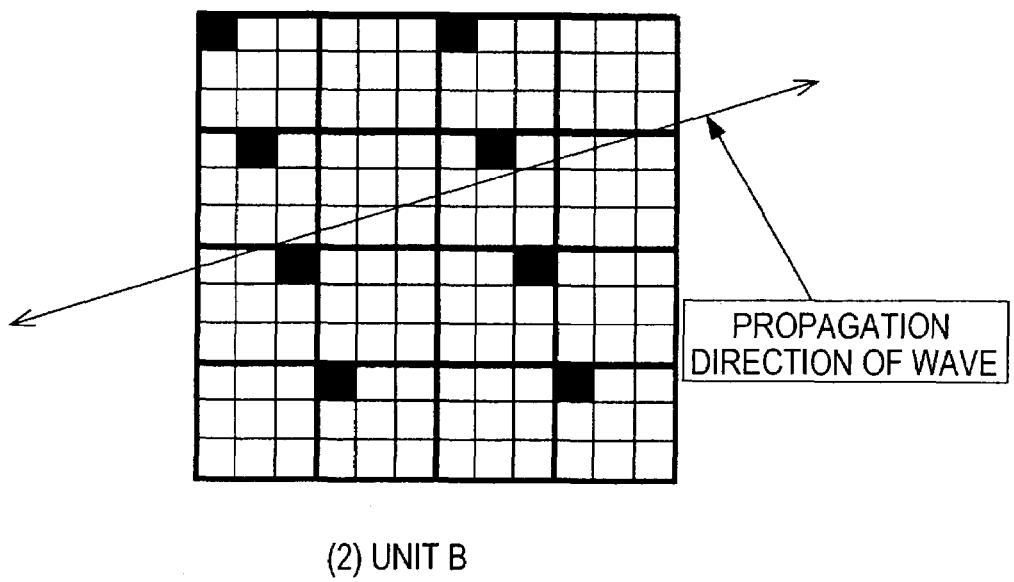
(2) UNIT B

FIG.6
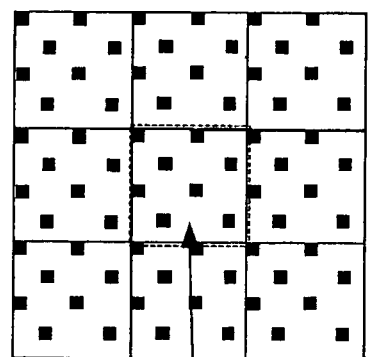
UNIT E
(1)
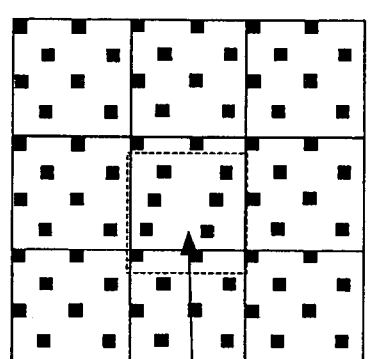
UNIT A
(2)
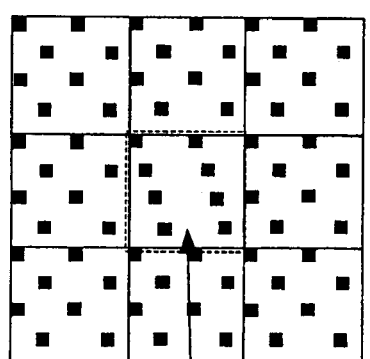
UNIT B
(3)

FIG.13
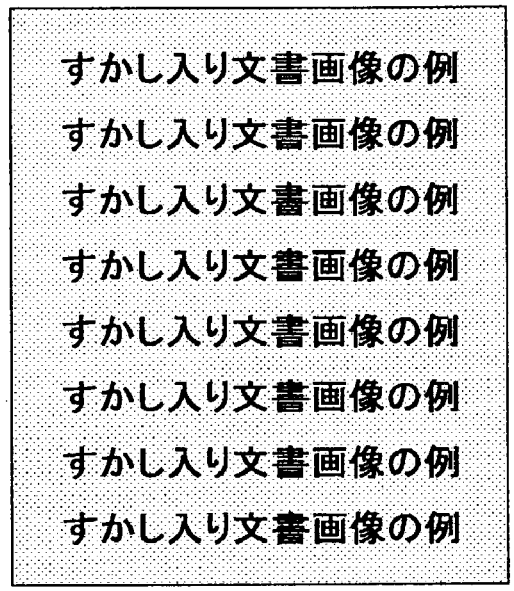
INPUT IMAGE
(1)
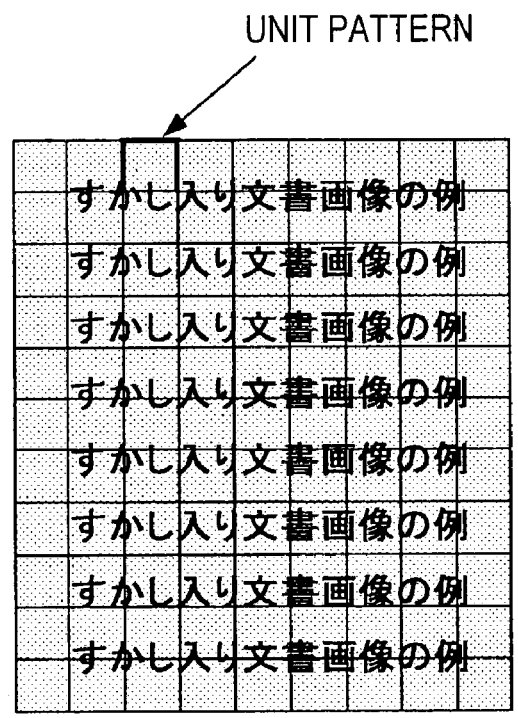
AFTER COORDINATE IS SET
(2)

UNIT PATTERN EXTRACTED AS BIT STRING REPRESENTING CODE LENGTH

UNIT PATTERN MATRIX

EXTRACTED DATA CODE UNIT

FIG.21
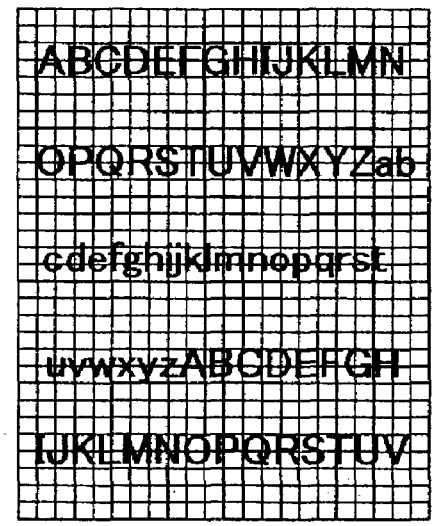
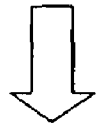
☐ DOT PATTERN WHICH DO NOT OVERLAP CHARACTER
■ DOT PATTERN WHICH OVERLAP CHARACTER
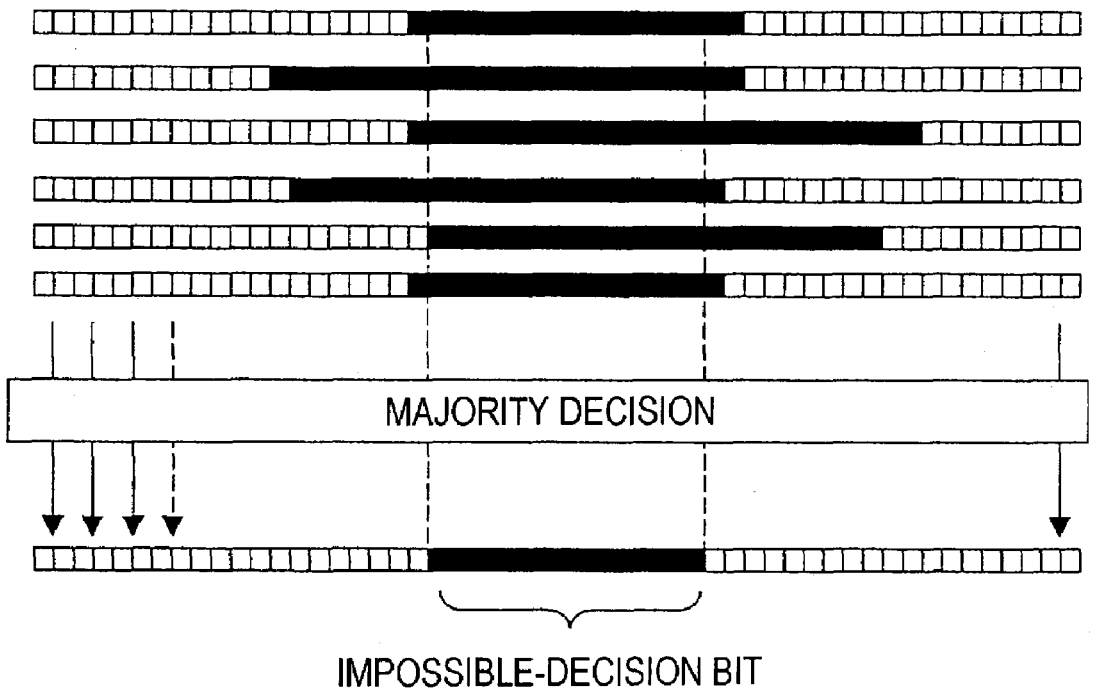

WATERMARK REGION   BURYING DIRECTION

- REGION 1
- REGION 2
- REGION 3
- REGION 4
- REGION 5

WATERMARK INFORMATION EMBEDDING DEVICE AND WATERMARK INFORMATION DETECTION DEVICE

BACKGROUND OF THE INVENTION

The present invention relates to a method of adding classified information to a document image in a non-character form and a technique for detecting classified information from a printed document with classified information.

DESCRIPTION OF THE RELATED ART

An "electronic watermark" obtained such that information or classified information for preventing copy and forgery is invisibly embedded in image or document data is formed on the assumption that all storage or exchange of data is performed on an electronic medium. Since the information embedded with watermark is deteriorated or eliminated, the information can be reliably detected. Similarly, in order to prevent a document printed on a paper medium from being illegally altered and copied, a method of embedding classified information which cannot be easily altered in a printed document in a non-character form which is visually comfortable is necessary.

As a method of embedding information to a monochromatic binary document which is most popularly used as a print, the following techniques are known.

[1] Japanese Patent Laid-Open Publication No. 2001-78006 "Method and Apparatus for embedding watermark information in monochromatic binary document image and for detecting the watermark information."

A minimum rectangle surrounding an arbitrary character string is divided into some blocks, and these blocks are classified into two groups (group 1 and group 2) (the number of groups may be three or more). For example, when a signal is 1, a characteristic quantity in a block of the group 1 is increased, and a characteristic quantity in each block of the group 2 is decreased. When the signal is 0, the reverse to the operation performed. Characteristic quantities in a block are the number of pixels in a character area, the thickness of a character, a distance to a point where the first character area is obtained by vertically scanning a block, and the like.

[2] Japanese Patent Laid-Open Publication No. 2001-53954 "Information Embedding Device, Information Reading Device, Electronic Watermark System", "Information Embedding Method", Information Reading Method, and Recording Medium."

It is assumed that the width and height of a minimum rectangle surrounding one character are defined as characteristic quantities for the character, and that a symbol is expressed by classification patterns of sizes of characteristic quantities of at least two characters. For example, six characteristic quantities are defied in three characters, and combinations of the patterns of the sizes of the characteristic quantities are listed. These combinations are classified into two groups, and are given with symbols, respectively. When embedded information is "0", and when a combination pattern of characteristic quantities of a character selected for expressing the embedded information is "1", any one of the six character quantities is changed by expanding the character area. A pattern to be changed is selected such that the change of the pattern is minimum.

[3] Japanese Patent Laid-Open Publication No. 9-179494 "Classified Information Recording Method."

It is supposed that a document is printed by a printer having a resolution of 400 dpi or more. Information is digitized to express the information a distance (the number of dots) between a reference point mark and a position decision mark.

[4] Japanese Patent Application No. 10-200743 "Document Processing Device."

Information is expressed by moving screen lines of a single line screen (special screen constituted by fine parallel lines) backward.

However, in the known techniques [1] and [2], pixels constituting characters of a document image, character intervals, and line intervals are changed, fonts and layouts change. In addition, also in the known techniques [3] and [4], since an accurate detection process in units of pixels must be performed to an input image read from an input device such as a scanner is necessary in detection, a degree of accuracy of information detection is considerably influenced by stain of a paper surface or noise added in printing or reading of the document.

In this manner, in the known techniques [1] to [4], when classified information embedded such that a printed document is input to a computer by an input device such as a scanner again is detected, many noise components are included in the input image due to stain of the printed document or image transformation such as rotation occurring in inputting. For this reason, it is disadvantageously difficult to correctly extract the classified information.

SUMMARY OF THE INVENTION

The invention has been made in consideration of the above problem held by a conventional watermark information embedding/detecting technique, and has as its object to provide a novel and improved watermark information embedding device and a novel and improved watermark information detecting device which can accurately extract classified information.

In order to solve the problem, according to the first aspect of the present invention, there is provided a watermark information embedding device. The watermark information embedding device according to the present invention includes: a document image forming section for forming document images in units of pages on the basis of document data; a watermark image forming section for forming a watermark image; and a watermarked image synthesizing section for overlapping the document image and the watermark image to form a watermarked document image.

In the watermark image, dot patterns of a plurality of types are regularly arranged, and a dot pattern of at least one type is given with classified information expressing a specific classified.

A plurality of dot patterns the wave directions and/or wavelengths of which are changed depending on dot arrangements are prepared, one symbol is given to one of the dot patterns, and the dot patterns are combined and arranged, so that the classified information is given.

Furthermore, a pattern deciding section for selecting a specific embedding pattern by which the dot patterns of a plurality of types are embedded may be arranged.

The pattern decision section changes some (for example, two or more) embedding patterns of the dot patterns to temporarily arrange the dot patterns before the dot patterns are actually arranged, and the pattern decision section can select the embedding pattern depending on the number (to be referred to the valid number of dot patterns hereinafter) of dot patterns which can be detected even though the document image and the watermark image are overlapped.

More specifically, with respect to the embedding patterns which are temporarily arranged, variances of the valid numbers of dot patterns of the dot patterns are calculated, and the embedding pattern having the minimum variance can be selected. Standard deviations may be calculated in place of the variances, so that a embedding pattern having the minimum standard deviation can also be selected.

Information related to the embedding pattern selected by the pattern decision section can be embedded in the watermarked document image as header information. In this case, when the information related to the embedding pattern is coded to be concealed from the third party, only a parson who knows the embedding pattern can restore the embedded watermark information.

The document image may be divided into regions, and the embedding patterns optimum for the divided regions can be selected. As an example of region division, region division depending on the characteristics of the document image can be performed such that an analysis process (characteristic recognition process) for characters or tables of the document image is performed by using an OCR (Optical Character Reader).

As a result of a characteristic recognition process for a document image, a region (for example, region of a graphic) in which a dot pattern (watermark information) is substantially rarely embedded may be detected. In such a divided region, the dot patterns may not be arranged. When information related to the divided region in which the dot patterns are not arranged is embedded as header information in the watermarked document image, watermark information need not be detected in the divided region in detection of the watermark information. As a result, detection efficiency can be improved.

In order to solve the above problem, according to the second aspect of the present invention, there is provided a watermark information detection device. The watermark information detection device according to the present invention includes a watermark detection section for detecting the watermark image on a watermarked document image formed by overlapping a document image and a watermark image embedded on which dot patterns of a plurality of types.

The watermark detection section includes a filter for extracting dot patterns of the same types as the plurality of types of the dot patterns of the watermark image, and the watermark detection section detects the watermark image by matching the watermarked document image.

In the watermark image, a plurality of dot patterns the wave directions and/or wavelength of which are changed depending on dot arrangements are prepared, one symbol is given to one of the dot patterns, and the dot patterns are combined and arranged, so that the classified information is given. The filter may be constituted by two-dimensional wavelet filters the number of which is equal to the number of dot patterns and which have the same wave directions and the same wavelengths as those of the dot patterns. As an example of the two-dimensional wavelet filter, a Gabor filter can be used.

In this case, convolutions (convolution integral) between an arbitrary region in the watermarked image and the plurality of two-dimensional wavelet filters is calculated, so that it can be determined that the dot pattern corresponding to the two-dimensional wavelet filter having the maximum convolution is embedded in the region.

BRIEF DESCRIPTION OF THE DRAWINGS

FIGS. 3(1) and 3(2) for explaining examples of watermark signals, in which FIG. 3(1) shows a unit A and FIG. 3(2) shows a unit B.

FIGS. 6(1), 6(2), and 6(3) for explaining background images, in which FIG. 6(1) shows a case in which the unit E is defined as a background unit, and the units E are closely arranged to form a background of a watermark image, FIG. 6(2) shows an example in which the unit A is embedded in the background image in FIG. 6(1), and FIG. 6(3) shows an example in which the unit B is embedded in the background image in FIG. 6(1).

FIGS. 13(1) and 13(2) are an input image (FIG. 13(1)) and an example of an input image (FIG. 13(2)) obtained after partition positions of a unit pattern are set.

FIG. 21 is a diagram for explaining a case in which detection of a dot pattern becomes impossible.

FIGS. 24A to 24D are diagrams for explaining an example of a embedding pattern, in which FIG. 24A shows the embedding pattern in a horizontal direction, FIG. 24B shows the embedding pattern in a vertical direction, FIG. 24C shows the embedding pattern in an oblique direction from upper right to lower left, and FIG. 24D shows the embedding pattern in an oblique direction from upper left to lower right.

FIG. 31 is a diagram for explaining an example in which the document in FIG. 30 is divided by characteristics such as vertical writing, horizontal writing, graphics, and the like.

DETAILED DESCRIPTION OF THE PREFERRED EMBODIMENTS

Figure 1:
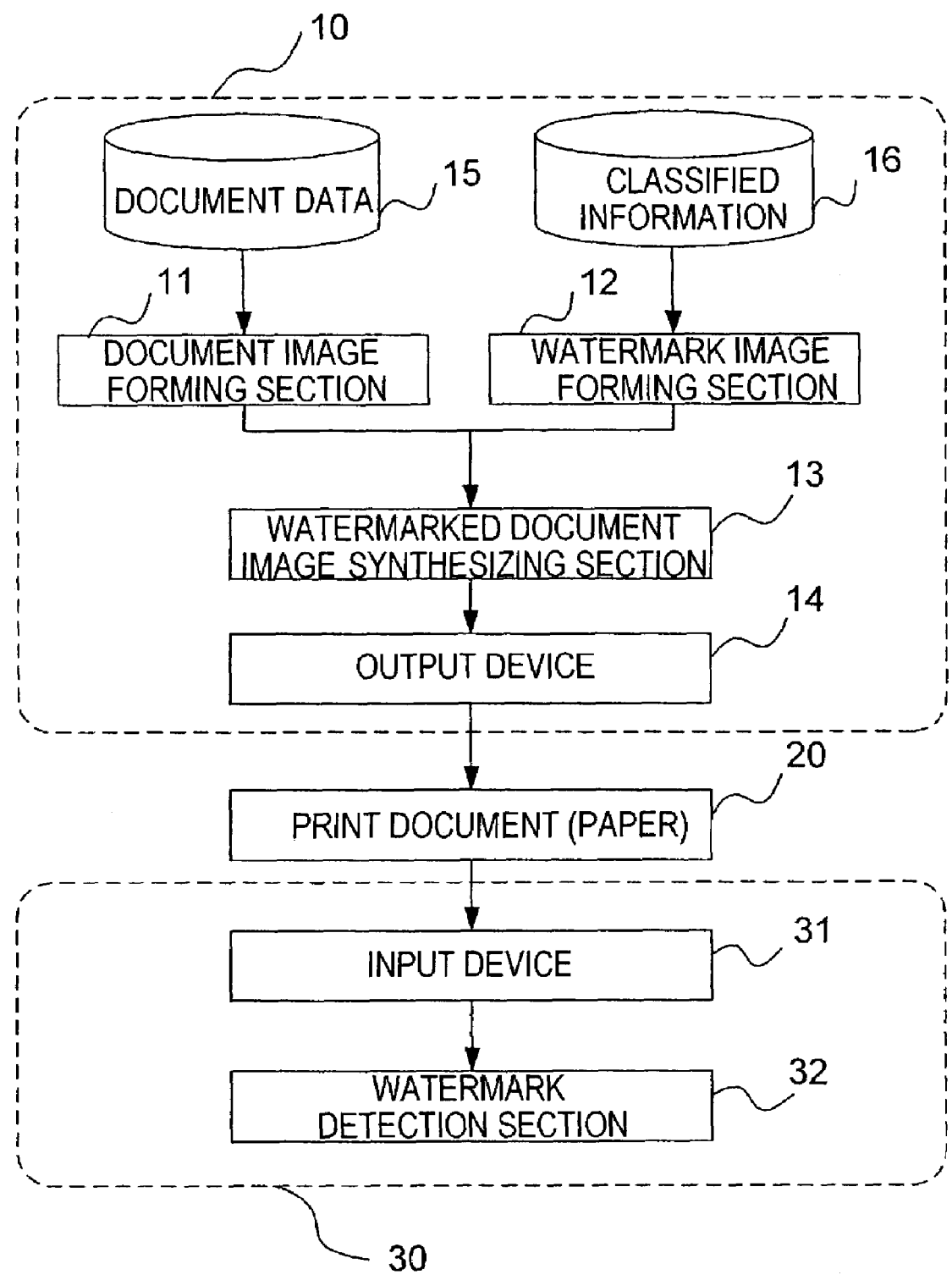
FIG. 1 is a diagram for explaining the configurations of a watermark information embedding device and a watermark information detection device according to the first embodiment.

Preferred embodiments of a watermark information embedding device and a watermark information detection device according to the present invention will be described below with reference to the accompanying drawings. In this specification and these drawings, the same reference numerals denote constituent elements substantially having the same functional configurations, and a description thereof will be omitted.

FIRST EMBODIMENT

FIG. 1 is a diagram for explaining the configuration of a watermark information embedding device and a watermark information detection device according to this embodiment.

(Watermark Information Embedding Device 10)

A watermark information embedding device 10 composes a document image on the basis of document data and classified information to be embedded in a document to print the document on a paper medium. The watermark information embedding device 10 is, as shown in FIG. 1, a document image forming section 11, a watermark image forming section 12, a watermarked document image synthesizing section 13, and an output device 14. Document data 15 is data formed by a document forming tool or the like. Classified information 16 is information or the like (character string, image, or voice data) to be embedded in a paper medium in a non-character form.

In the document image forming section 11, an image expressing a state obtained by printing the document data 15 on a paper surface. More specifically, a white-pixel region in the document image is a non-print part, and a black-pixel region is a part coated with a black paint. In this embodiment, it is assumed that a printing operation is performed by using a black ink (monochrome) on a white paper surface. However, the present invention is not limited to the embodiment. That is, even though a printing operation is performed in color (multi-color), the present invention can be also applied.

The watermark image forming section 12 performs N-dimensional coding (N is 2 or more) to a numerical value obtained by digitizing the classified information 16 and allocate the symbols of codes to signals prepared in advance. The signal arranges dots in a rectangular region having an arbitrary shape to express a wave having an arbitrary direction and a wavelength and allocates symbols to the wave direction, the wavelength, and the like. A watermark image is obtained by arranging these signals on an image depending on a certain regulation.

The watermarked document image synthesizing section 13 overlaps the document image and the watermark image to form a watermarked document image. The output device 14 is an output device such as a printer. The output device 14 prints the watermarked document image on a paper medium. Therefore, the document image forming section 11, the watermark image forming section 12, and the watermarked document image synthesizing section 13 may be realized as one function in a printer driver.

A print document 20 is printed such that the classified information 16 is embedded in the original document data 15, and is physically stored and managed.

(Watermark Information Detection Device 30)

A watermark information detection device 30 is a device which takes a document printed on a paper medium as an image and which restores embedded classified information. The watermark information detection device 30 is, as shown in FIG. 1, constituted by an input device 31 and a watermark detection section 32.

The input device 31 is an input device such as a scanner. The watermark detection section 32 takes the document 20 printed on a sheet of paper as a gray image having a multi-valued tone in computer. The watermark detection section 32 performs a filter process to the input image and detects embedded signals. The watermark detection section 32 restores symbols from the detected signals and takes embedded classified information.

The operations of the watermark information embedding device 10 and the watermark information detection device 30 which are constituted as described above will be described below. The operation of the watermark information embedding device 10 will be described below with reference to FIGS. 1 to 11.

(Document Image Forming Section 11)

The document data 15 is data including font information and layout information, and is formed by word processor software or the like. The document image forming section 11 forms images which expresses states in which documents are printed on sheets of paper in units of pages on the basis of the document data 15. This document image is a monochromatic binary image. It is assumed that white pixels (the pixel value is 1.) on the image indicate a background and that black pixels (the pixel value is 0.) indicate a character region (region coated with ink).

(Watermark Image Forming Section 12)

The classified information 16 includes various data such as character data, audio data, and image data. In the watermark image forming section forms a watermark image to be overlapped as a background of a document image on the basis of the information.

Figure 2:
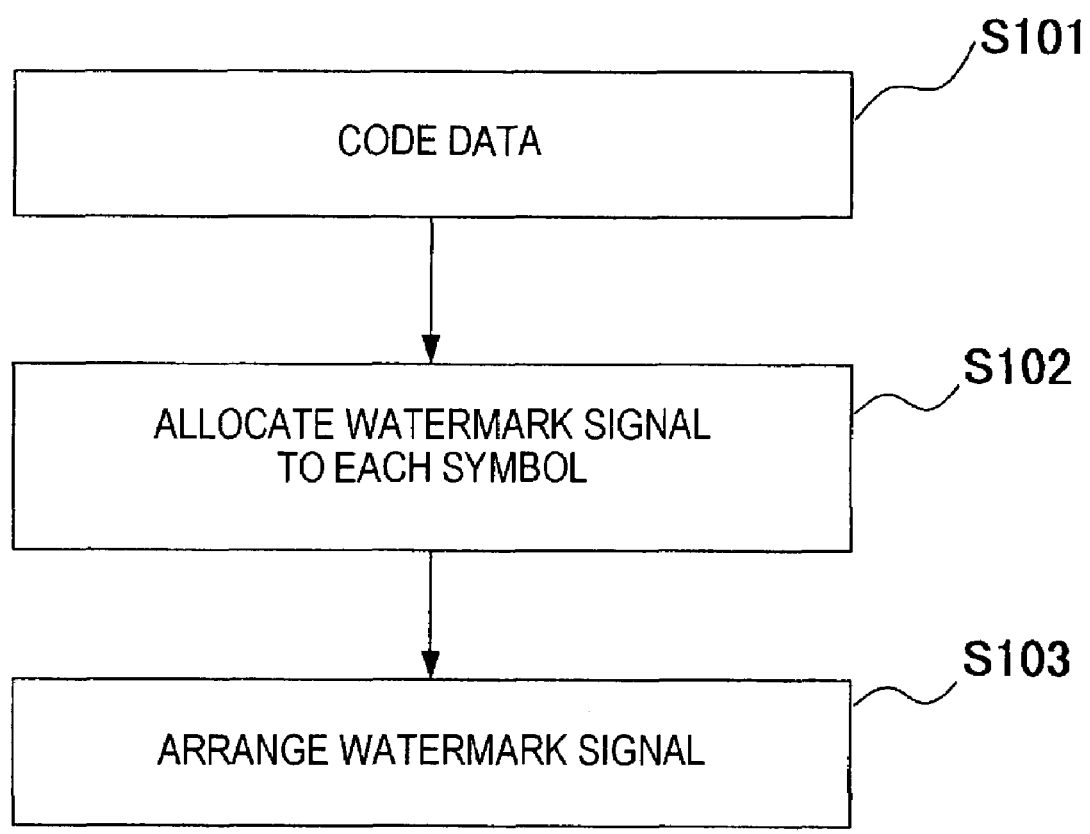
FIG. 2 is a flow chart showing a flow of processes of the watermark forming section 12.

FIG. 2 is a flow chart showing a flow of processes of the watermark image forming section 12.

The classified information 16 is converted into an N-dimensional code (step S101). Although the number N is arbitrarily set, N=2 is satisfied for descriptive convenience in this embodiment. Therefore, a code generated in step 101 is a 2-dimensional code, and is expressed by a bit string consisting of 0 and 1. In step S101, the data may be directly coded, or the data may be encrypted and then coded.

Watermark signals are allocated to the symbols of codes (step S102). The watermark signal is obtained by expressing a wave having an arbitrary wavelength and an arbitrary direction by an arrangement of dots (black pixels). The watermark signal will be further described in detail.

A signal unit corresponding to the bit string of the coded data is arranged on a watermark image (step S103).

In step 102, the watermark signals allocated to the symbols of the codes will be described below. FIG. 3 is a diagram for explaining an example of a watermark signal.

The width and height of the watermark signal are represented by Sw and Sh. The width Sw and the height Sh may be different from each other. However, Sw=Sh is satisfied for descriptive convenience in this embodiment. The unit of the length is the number of pixels. In the example in FIG. 3, Sw=Sh=12 is satisfied. The sizes of signals printed on a paper surface are dependent on the resolution of the watermark image. For example, when the watermark image is an image having a resolution of 600 dpi (dot per inch; the unit of resolution which is the number of dots per inch), the width and height of the watermark signal in FIG. 3 satisfy $12/600=0.02$ (inch) on a print document.

A rectangle having the width Sw and the height Sh is called a "signal unit" as a unit of one signal. In FIG. 3(1), the distance between dots are dense in a direction of arctan (3) (arctan is the reciprocal function of tan) with respect to the horizontal axis, and a propagation direction of wave is given by arctan (−⅓). This signal unit is called a unit A. In FIG. 3(2), the distance between dots are dense in a direction of arctan (−3) with respect to the horizontal axis, and a propagation direction of wave is given by arctan (⅓). In the following description, this signal unit is called a unit B.

Figure 4:
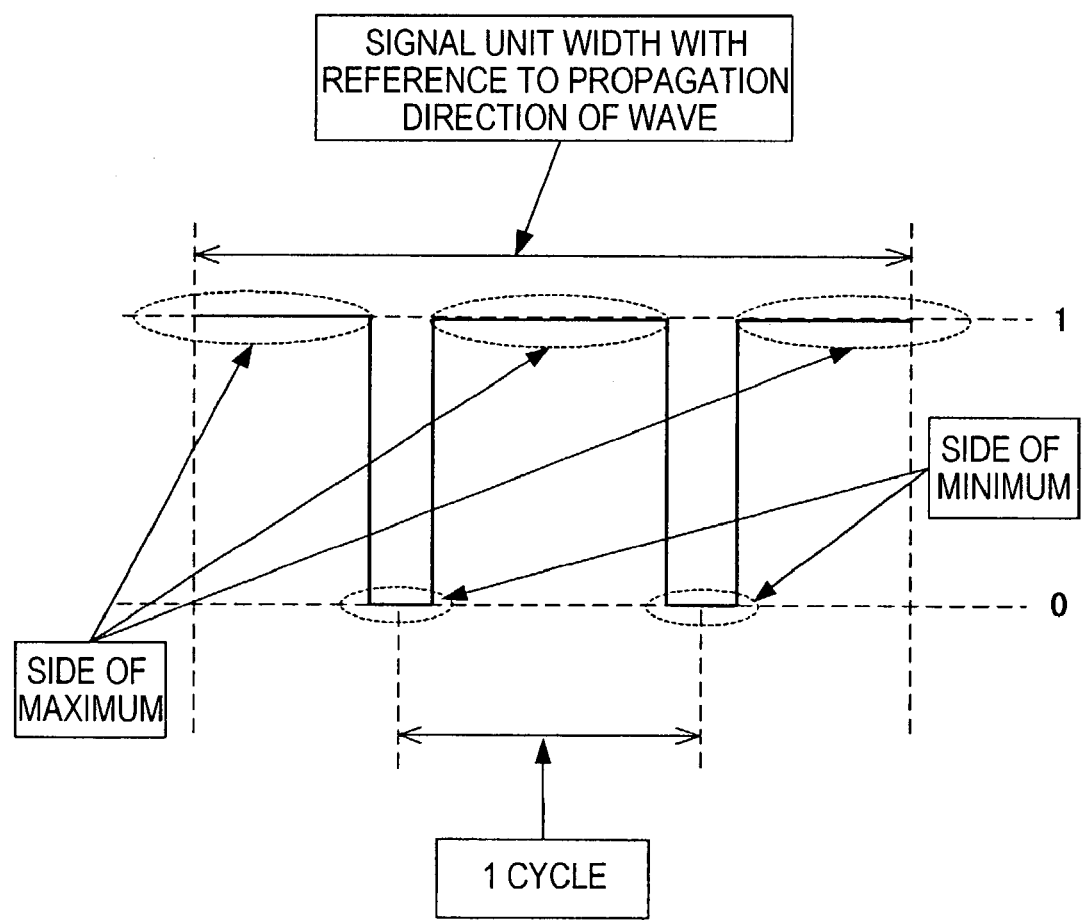
FIG. 4 is a sectional view showing a change in pixel value in FIG. 3(1) when viewed in the direction of arctan (⅓).

FIG. 4 is a sectional view showing changes in pixel value in FIG. 3(1) when viewed in the direction given by arctan (⅓). In FIG. 4, a portion where dots are arranged indicates a loop (point where an amplitude is maximum) of the minimum value of a wave, and a portion where no dots are arranged indicates a loop of the maximum value of a wave.

Since one unit includes two regions in which dots are densely arranged, a frequency per unit is 2 in this example. Since the propagation direction of the wave is vertical to the direction in which the dots are densely arranged, a wave of the unit A has a direction given by arctan (−⅓) with respect to the horizontal direction, and a wave of the unit B has a direction given by arctan (⅓). When the direction given by arctan (a) is vertical to the direction given by arctan (b), a×b=−1 is satisfied.

In the embodiment, symbol 0 is allocated to a watermark signal expressed by the unit A, and symbol 1 is allocated to a watermark signal expressed the unit B. These units are called symbol units.

Figure 5:
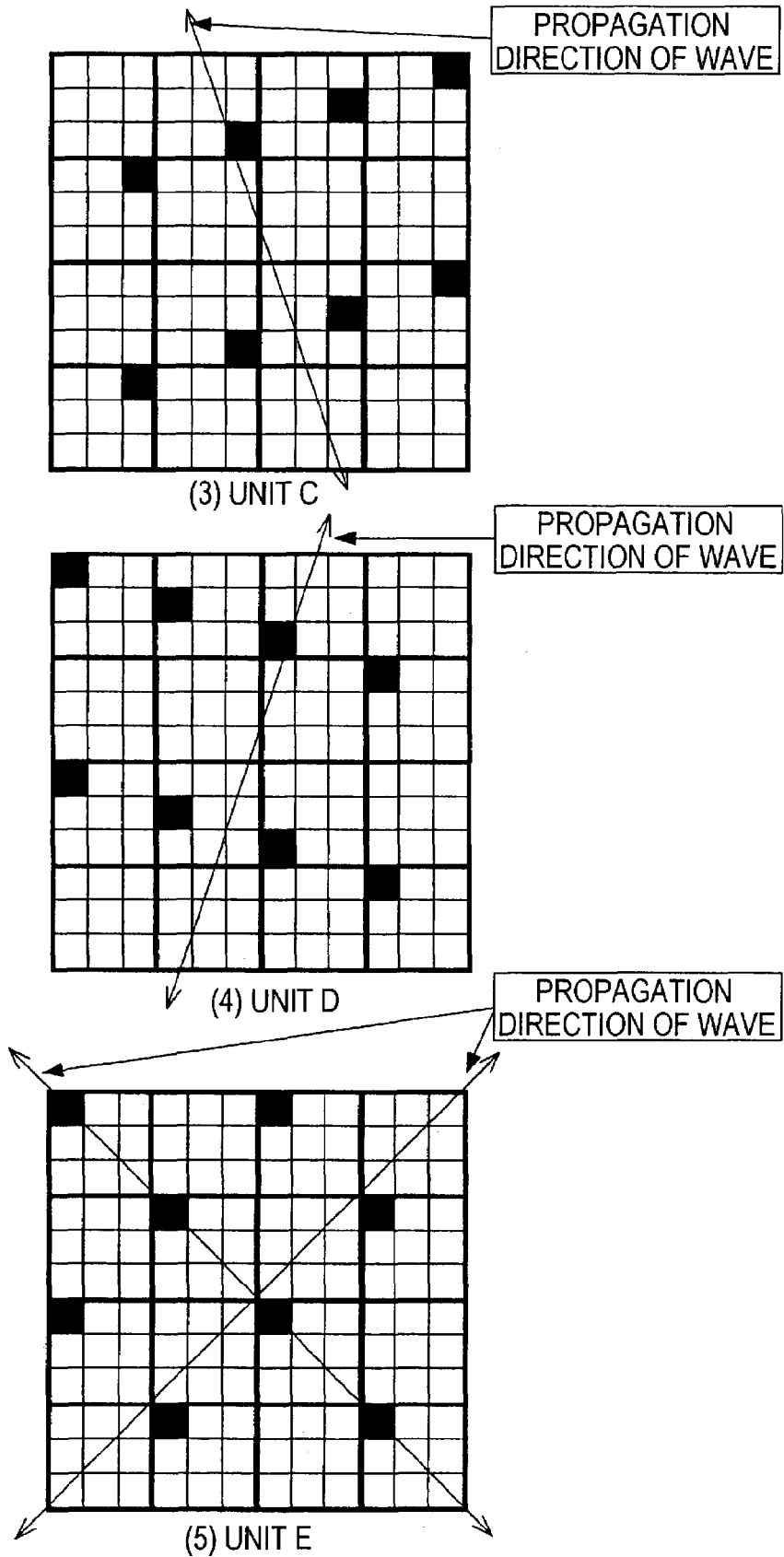
FIGS. 5(3), 5(4), and 5(5) are diagrams for explaining examples of watermark signals, in which FIG. 5(3) shows a unit C, FIG. 5(4) shows a unit D, and FIG. 5(5) shows a unit E.

As watermark signals, in addition to the watermark signals shown in FIGS. 3(1) and 3(2), for example, dot arrangements shown in FIGS. 5(3) to 5(5) may be considered. In FIG. 5(3), the distance between dots are dense in the direction given by arctan (⅓) with respect to the horizontal axis, and a propagation direction of wave is given by arctan (−3). This signal unit is called a unit C.

In FIG. 5(4), the distance between dots are dense in the direction given by arctan (−⅓) with respect to the horizontal axis, and a propagation direction of wave is given by arctan (3). This signal unit is called a unit D. In FIG. 5(5), the distance between dots are dense in a direction given by arctan (1) with respect to the horizontal axis, and a propagation direction of wave is given by arctan (−1). In FIG. 5(5), the distance between dots may be dense in the direction given by arctan (−1) with respect to the horizontal axis, and the propagation direction of wave may be given by arctan (1). This signal unit is called a unit E hereinafter.

In this manner, in addition to a combination allocated in advance, a plurality of patterns of combinations of units to which symbol 0 and symbol 1 are allocated can be considered. For this reason, a specific symbol to which a specific watermark signal can be allocated is concealed from the third party, so that embedded signals cannot be easily read by the third party (dishonest person).

In addition, in step S102 shown in FIG. 2, when classified information is coded by a four-dimensional code, for example, symbol 0, symbol 1, symbol 2, and symbol 3 which serve as codes can also be allocated to the unit A, the unit B, the unit C, and the unit D, respectively.

In the examples of the watermark signals shown in FIGS. 3 and 5, the numbers of dots in all units are equal to each other. For this reason, these units are closely arranged, the apparent thickness of the watermark images become uniform. Therefore, on a printed paper surface, it seems that a gray image having a single density is embedded as a background.

In order to obtain such an effect, for example, the unit E is defined as a background unit (signal unit to which symbol is not allocated). The units E are closely arranged to form a background of a watermark image. When symbol units (unit A and unit B) are embedded in the watermark image, the background unit (unit E) a position where a unit is to be embedded is replaced with the symbol unit (unit A and unit B).

FIG. 6(1) is a diagram for explaining a case in which the units E defined as background units are closely arranged to form a background of a watermark image. FIG. 6(2) shows an example in which the unit A is embedded in the background image in FIG. 6(1), FIG. 6(3) shows an example in which the unit B is embedded in the background image in FIG. 6(1). This embodiment describes the method using the background units as the background of the watermark image. However, only symbol units may be arranged to generate a watermark image.

A method of embedding one symbol of a code in a watermark image will be described below with reference to FIG. 7.

Figure 7:
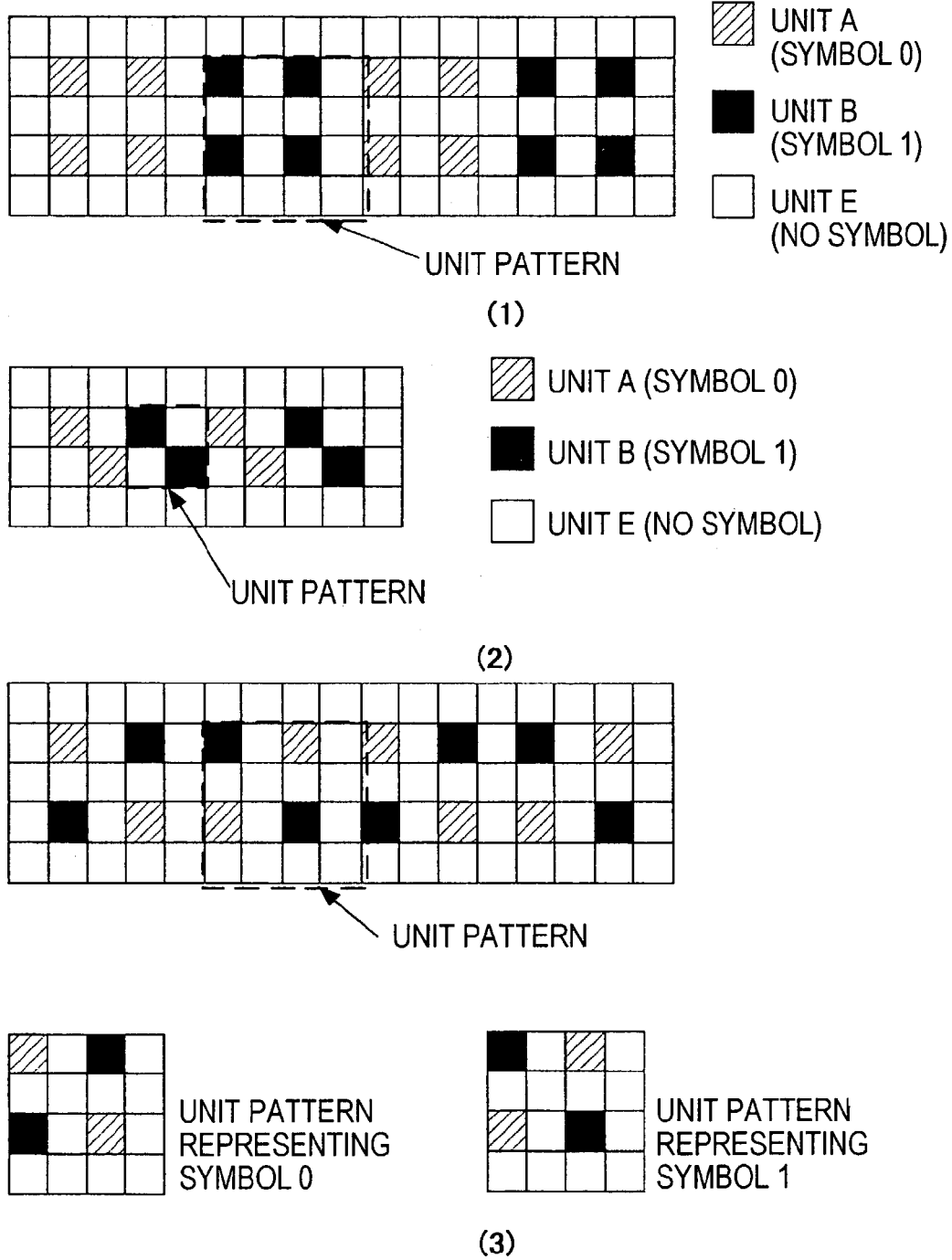
FIG. 7 is a diagram for explaining an example of a method of embedding a symbol into a watermark image.

FIGS. 7(1) to 7(3) are diagrams for explaining examples of a method of embedding a symbol in a watermark image. In FIGS. 7(1) to 7(3), a case in which a bit string expressed as "0101" is embedded in a watermark image will be exemplified.

As shown in FIGS. 7(1) and 7(2), the same symbol units are repeatedly embedded. This prevents a signal from being detected in signal detection when a character in a document overlaps a embedded symbol unit. The number of repetitions of the symbol units and an arrangement pattern (to be referred to as a unit pattern hereinafter) are arbitrarily set.

More specifically, as an example of a unit pattern, as shown in FIG. 7(1), the number of repetitions can be set to be 4 (one unit pattern includes four symbol units), and, as shown in FIG. 7(2), the number of repetitions can be set to be 2 (one unit includes two symbols). Furthermore, the number of repetitions may be set to be 1 (one unit pattern includes only one symbol unit).

In FIGS. 7(1) and 7(2), one symbol is given to one symbol unit. However, as shown in FIG. 7(3), a symbol may be given to an arrangement pattern of symbol units.

The number of bits of information quantity in a watermark image of one page depends on the size of a signal unit, the size of a unit pattern, and the size of a document image. The numbers of signals embedded in the horizontal direction and the vertical direction of the document image may be set to be known to perform signal detection, or the number of signals may be calculated back from the size of an image input from the input device and the size of a signal unit.

When it is assumed Pw unit patterns and Ph unit patterns can be embedded in a watermark image of one page in the horizontal direction and the vertical direction, respectively, a unit pattern at an arbitrary position in the image is expressed by U(x,y), where x=1 to Pw, y=1 to Ph, and U(x, y) is called a "unit pattern matrix". The number of bits which can be embedded in one page is called "the number of embedded bits". The number of embedded bits is given by Pw×Ph.

Figure 8:
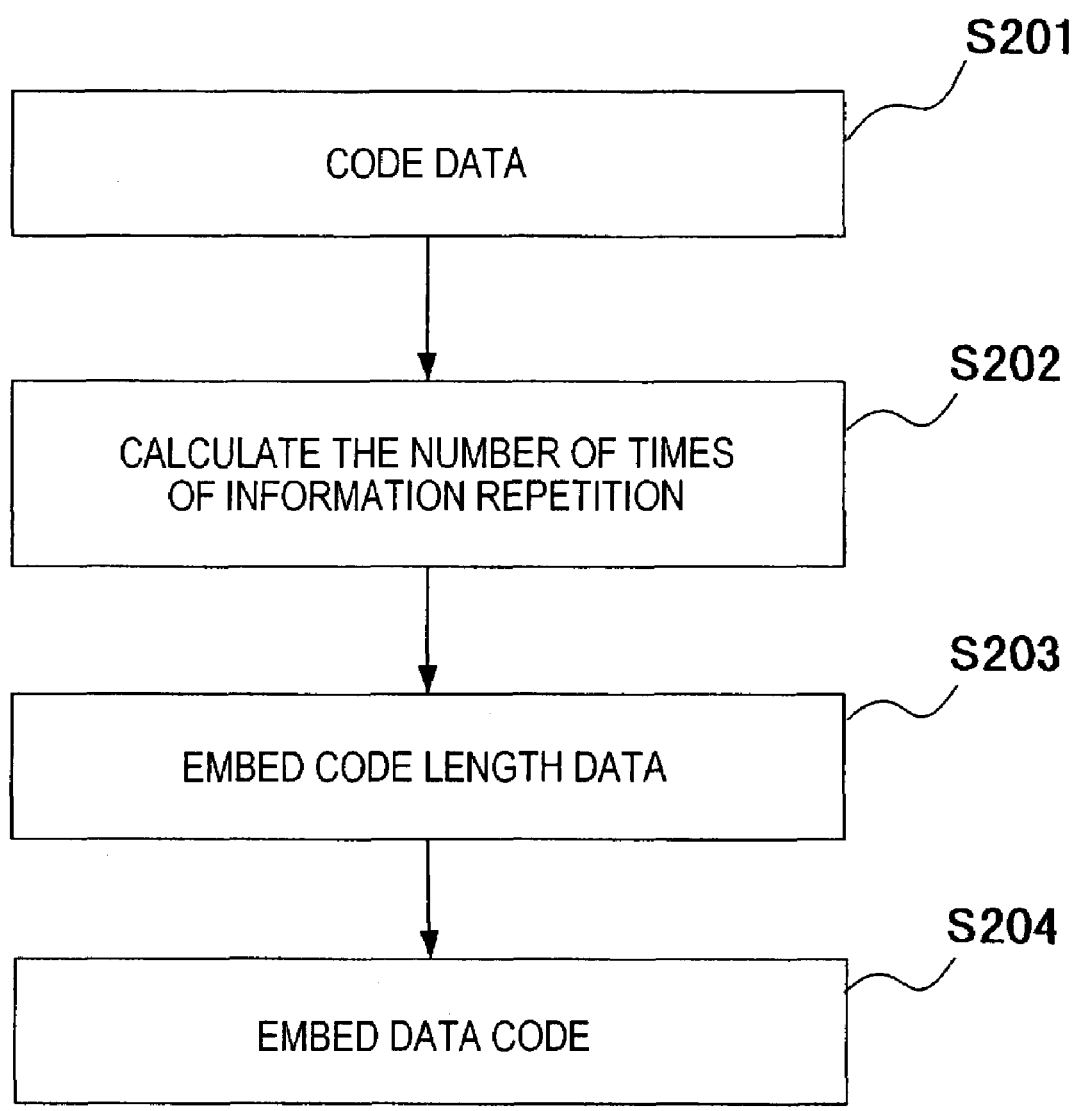
FIG. 8 is a flow chart showing a method of embedding classified information in a watermark image.

FIG. 8 is a flow chart showing a method of embedding classified information in a watermark image.

In FIG. 8, a case in which the same information is repeatedly embedded in one (one page) watermark image. The same information is repeatedly embedded to make it possible to extract the embedded information even though the embedded information is eliminated by entirely marking out one unit pattern when the watermark image and the document image overlap.

The classified information 16 is converted into an N-dimensional code (step S201). This step is similar to step S101 in FIG. 2. In the following description, coded data is called a data code, and a data code expressed by a combination of unit patterns is called a data code unit Du.

On the basis of the number of a code length (the number of bits in this case) of a data code and the number of embedded bits, the number of times of repetition of data code units which can be embedded in one image is calculated (step S202). In this embodiment, it is assumed that the code length data of a data code is inserted into the first row of a unit pattern matrix. The code length of the data code may be set to be a fixed length, and the code length data may not embedded in the watermark image.

The number of times Dn of embedding of a data code unit is calculated by the following equation where a data code length is represented by Cn.

$$Dn = \left\lfloor \frac{Pw \times (Ph-1)}{Cn} \right\rfloor \quad \text{[Equation 1]}$$

$\lfloor A \rfloor$ is maximum integer which is not more than A.

In this equation, when a remainder is represented by Rn (Rn=Cn−(Pw×(Ph−1))), data code units the number of which is equal to the number of times Dn and a unit pattern corresponding to Rn start bits of the data code are embedded in the unit pattern matrix. The Nn bits of the remainder part is not necessarily embedded.

Figure 9:
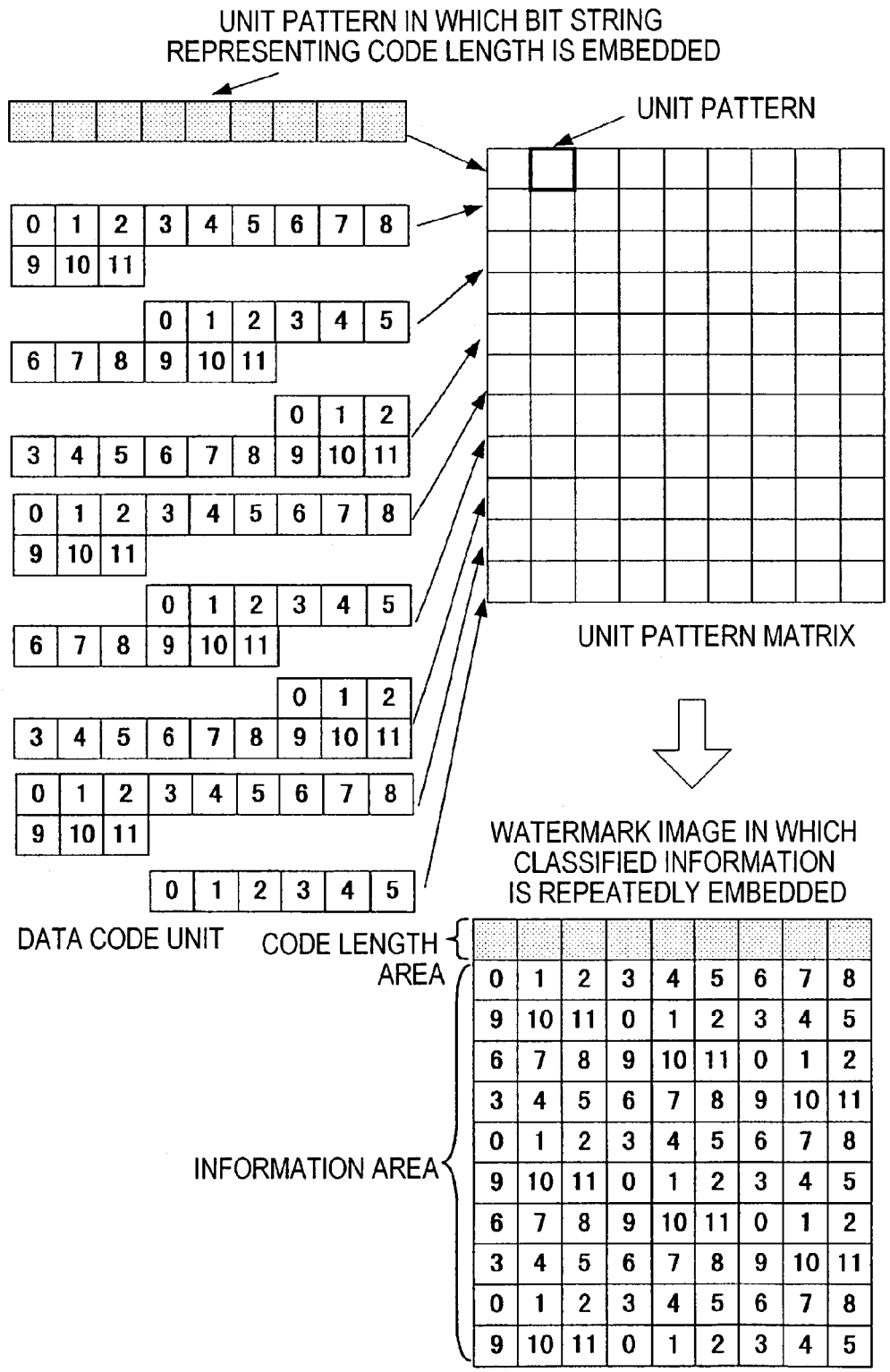
FIG. 9 is a flow chart showing a flow of processes of a watermark detection section 32.

In the description in FIG. 9, it is assumed that the size of the unit pattern matrix is given by 9×11 (11 rows×9 columns) and that a data code length is 12 (numbers 0 to 11 in FIG. 9 denote code words of data codes).

Code length data is embedded in the first row of the unit pattern matrix (step S203). In the example in FIG. 9, the code length is expressed by 9-bit data, and the code length data is embedded only once. However, when the width Pw of the unit pattern matrix is sufficiently large, like the data code, the code length data can also be repeatedly embedded.

In addition, in the second and subsequent rows of the unit pattern matrix, the data code units are repeatedly embedded (step S204). As shown in FIG. 9, the data code units are sequentially embedded from the MSB (most significant bit) or LSB (Least significant bit) of the data codes in the direction of the row. In the example in FIG. 9, the data code unit is embedded 7 times, and 6 start bits of the data code are embedded.

In the method of embedding data, as shown in FIG. 9, the data code units may be embedded such that the data code units continue in the direction of the row, or may be embedded such that the data code units continue in the direction of the column.

A watermark image in the watermark image forming section 12 has been described above. The watermarked document image synthesizing section 13 in the watermark information embedding device 10 will be described below.

(Watermarked Document Image Synthesizing Section 13)

In the watermarked document image synthesizing section 13, a document image formed by the document image forming section 11 overlaps a watermark image formed by the watermark image forming section. The value of the pixels of the watermarked document image is calculated by an AND operation of corresponding pixel values of the document image and the watermark image. More specifically, when any one of the pixel values of the document image and the watermark images is 0 (black), the pixel value of the watermarked document image is 0 (black), and the other pixel value is 1 (white).

Figure 10:
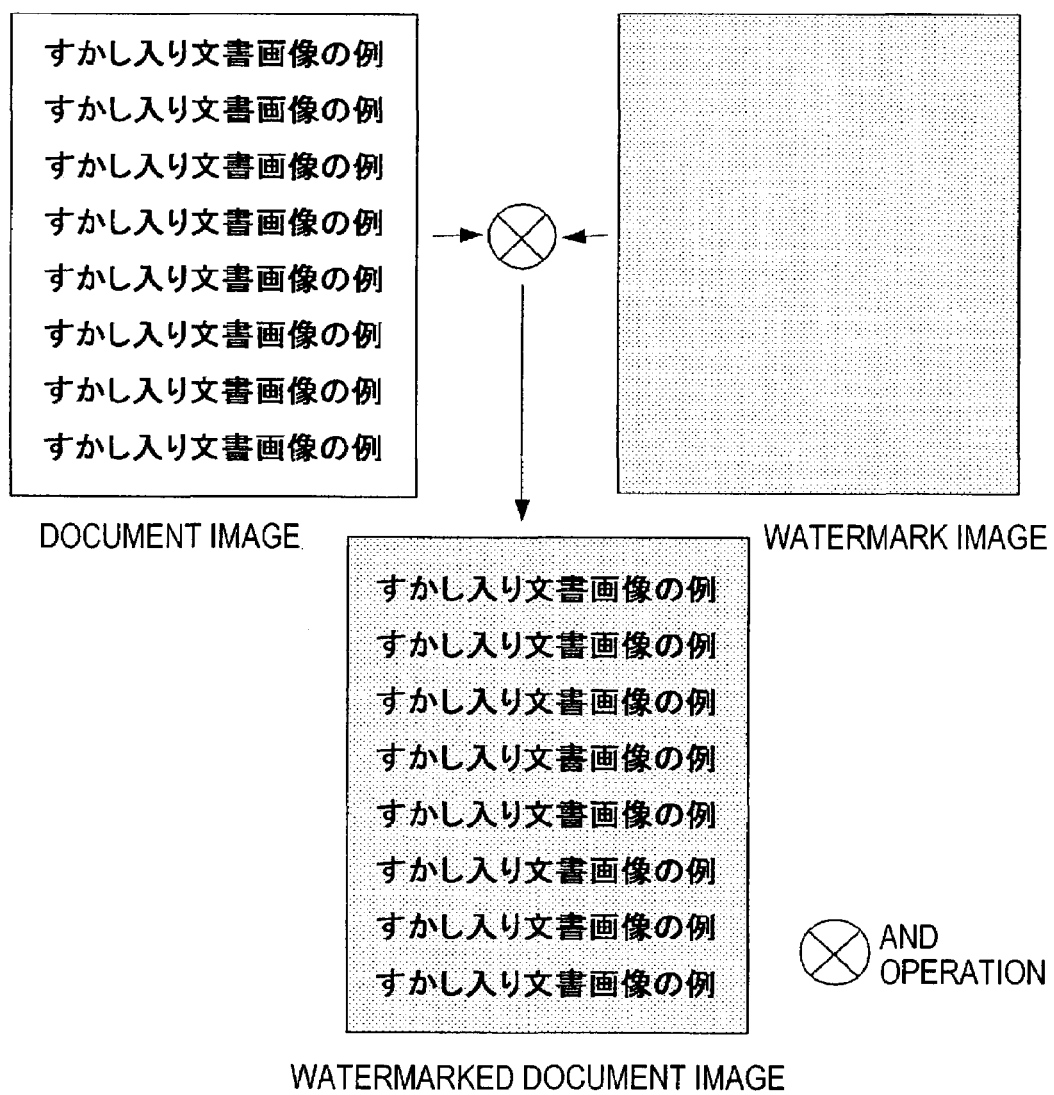
FIG. 10 is a diagram for explaining an example of a watermarked document image.
Figure 11:
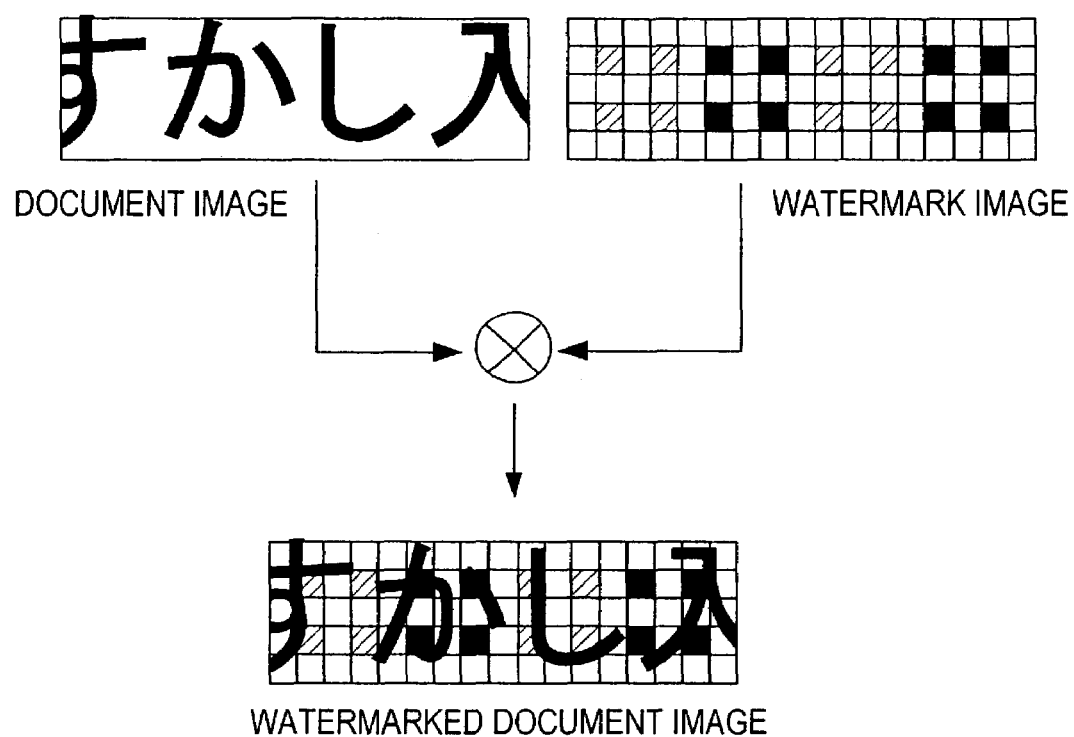
FIG. 11 is a partially enlarged diagram for explaining a part of FIG. 10.

FIG. 10 is a diagram for explaining an example of the watermarked document image. FIG. 11 is a partially enlarged diagram for explaining FIG. 10. In FIG. 11, as a unit pattern, a pattern in FIG. 7(1) is used. The watermarked document image is output from the output device 14.

The operation of the watermark information embedding device 10 has been described above.

The operation of the watermark information detection device 30 will be described below with reference to FIG. 1 and FIGS. 12 to 20.

(Watermark Detection Section 32)

Figure 12:
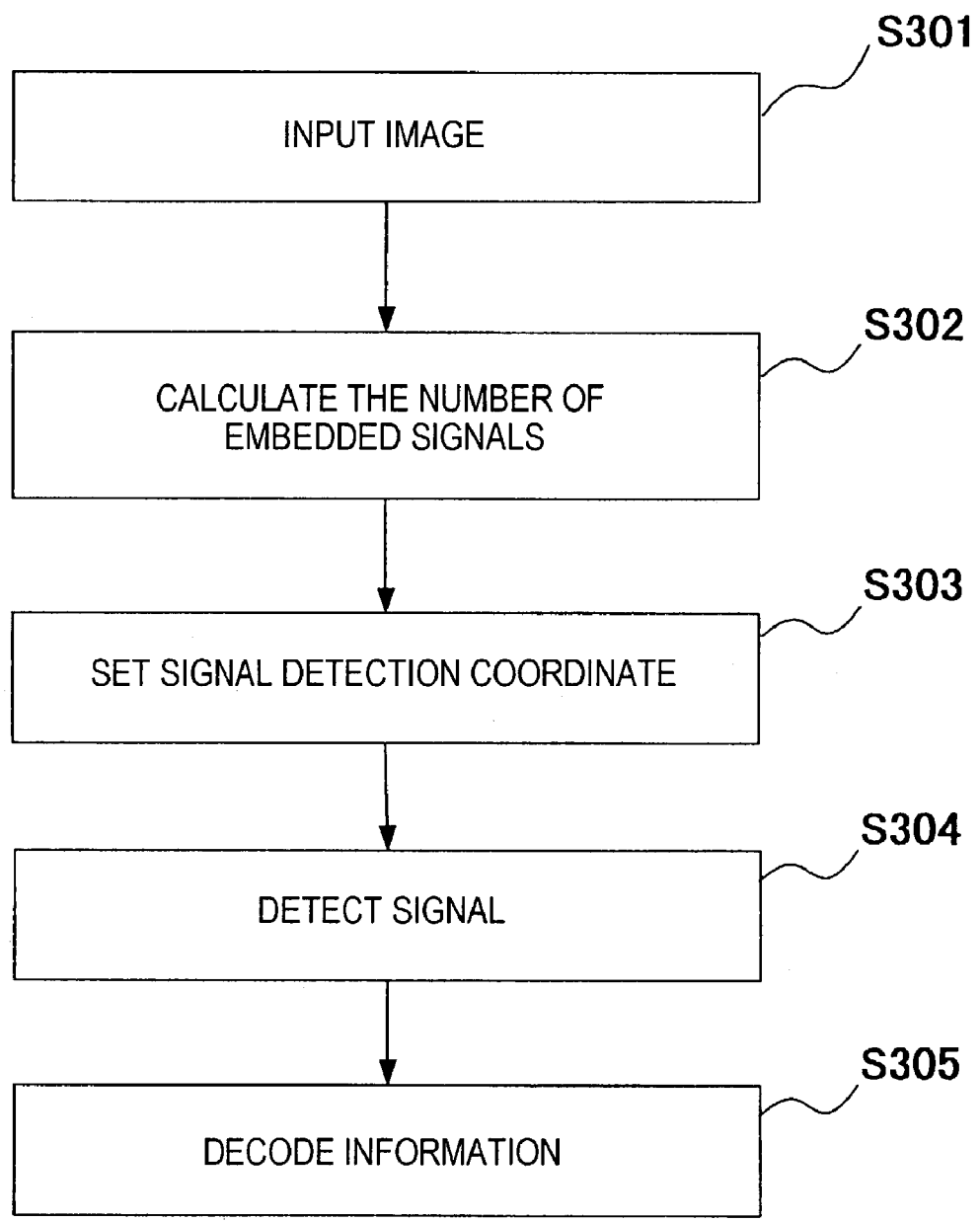
FIG. 12 is a flow chart showing a flow of processes of the watermark detection section 32.

FIG. 12 is a flow chart showing a flow of processes of the watermark detection section 32.

A watermarked document image is input to a memory or the like of a computer by the input device 31 such as a scanner (step S301). This image is called an input image. The input image is a multi-value image, and will be described below as a gray image having 256 tones. The resolution (resolution used when the input device 31 is loaded) of the input image may be different from that of the watermarked document image formed by the watermark information embedding device 10. However, in the following description, it is assumed that the resolution of the input image is equal to the resolution of the image formed by the watermark information embedding device 10. It is assumed that the input image is subjected to corrections such as rotation, expansion, and compression.

On the basis of the size of the input image and the size of the signal unit, the number of unit patterns embedded in the image is calculated (step S302). For example, it is assumed that the size of the input image is given by W (width)×H (height) and that the size of the signal unit is given by Sw×Sh. In this case, if the unit pattern is constituted by Uw×Uh units, the number of unit patterns (N=Pw×Ph) embedded in the input image is calculated as follows:

$$Pw = \frac{W}{Sw \times Uw}, Ph = \frac{H}{Sh \times Uh} \quad \text{[Equation 2]}$$

However, when the watermark information embedding device 10 and the watermark information detection device 30 have different resolutions, after the sizes of the signal units in the input image are normalized by the ratio of the resolutions, and the above calculation is performed.

Partition positions of the unit patterns are set for the input image on the basis of the number of unit patterns calculated in step S302 (step S303). FIGS. 13(1) show an input image (FIG. 13(1)) and an input image (FIG. 13(2)) obtained after the partition positions of the unit patterns are set.

A symbol unit is detected every partition of the unit patterns to restore a unit pattern matrix (step S304). The details of the signal detection will be described below.

Figure 14:
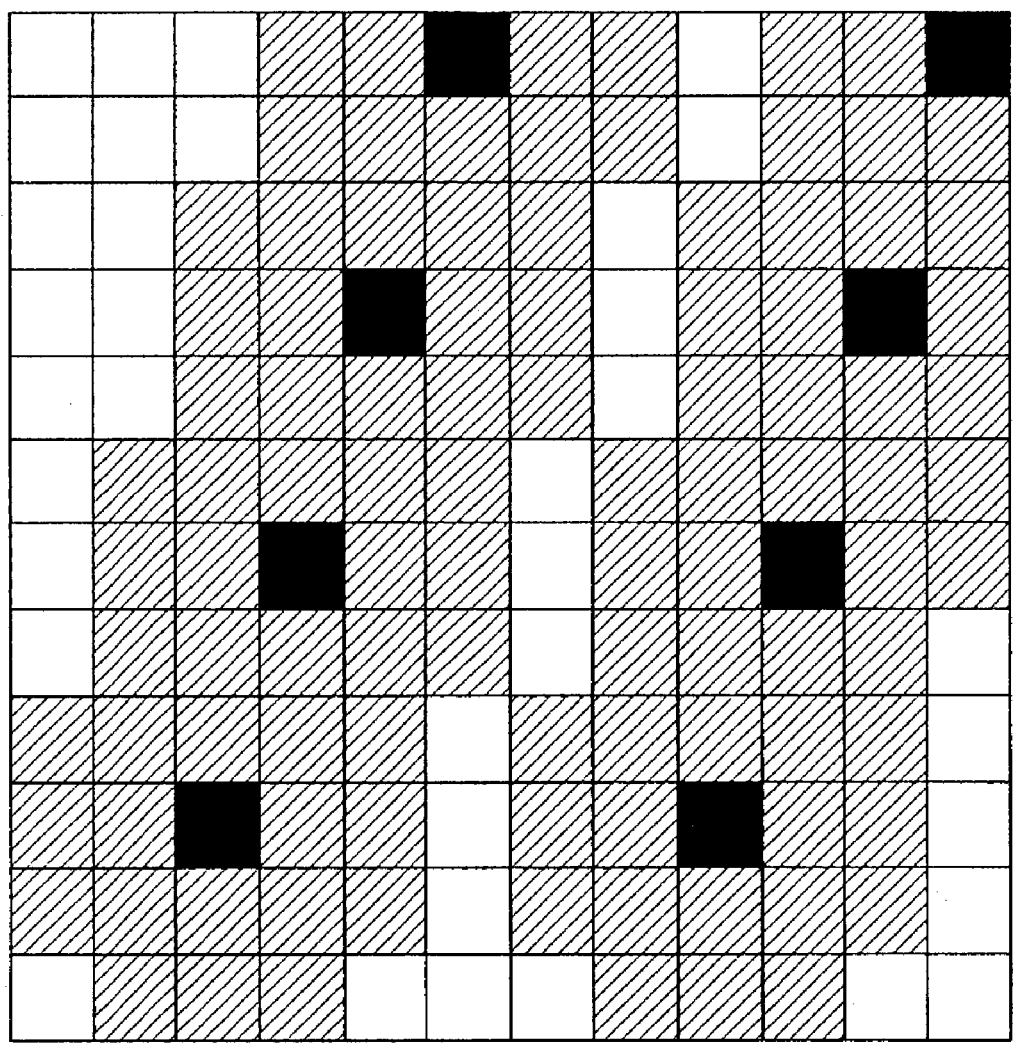
FIG. 14 is a diagram for explaining an example of an area corresponding to a unit A in an input image.
Figure 15:
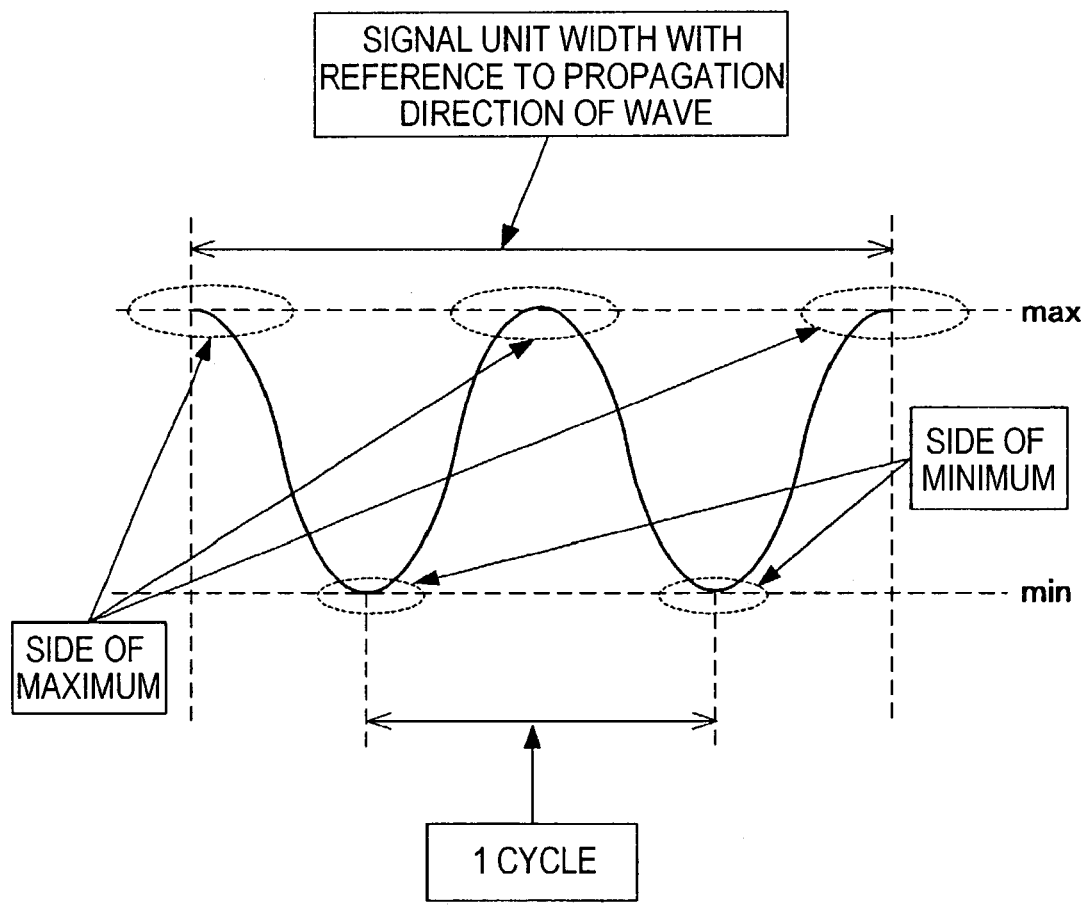
FIG. 15 is a sectional view of FIG. 14 when viewed in a direction parallel to a propagation direction of wave.

FIG. 14 is a diagram for explaining an example of a region corresponding to the unit A shown in FIG. 3(1) in the input image. Although the signal image is a binary image in FIG. 3, the image is a multi-value image in FIG. 14. When the binary image is printed, the thickness of the image continuously changes due to ink bleed or the like. For this reason, the periphery of each dot has a color between white and black as shown in FIG. 14. Therefore, a sectional view of the region in FIG. 14 when viewed in a direction parallel to the propagation direction of wave. Although a rectangular wave is obtained in FIG. 4, a smooth wave is obtained in FIG. 15.

In fact, although many noise components are added to the input image due to factors such as a local change of thickness of a sheet of paper, stain of a printed document, and instability of an output device or an image input device, a case in which the input image is free from a noise component will be described below. However, by using the method described here, stable signal detection can also be performed in an image to which noise components are added.

In order to detect a signal unit in the input image, a two-dimensional wavelet filter which can simultaneously define the frequency, direction, and influence region of wave is used. In the following description, a Gabor filter which is one of two-dimensional wavelet filters is used. However, any filter which is other than the Gabor filter and has the same nature as that of the Gabor filter may be used. In addition, the a method of defining a template having the same dot pattern as that of the signal unit to perform pattern matching may also be used.

The Gabor filter G(x,y) where x=0 to gw−1 and y=0 to gh−1 will be described below. Reference symbols gw and gh denote a file size. In this case, the Gabor filter has a size equal to that of the signal unit embedded in the watermark information embedding device 10.

$$G(x, y) = \exp\left[-\pi\left\{\frac{(x-x0)^2}{A^2} + \frac{(y-y0)^2}{B^2}\right\}\right] \times \exp[-2\pi i\{u(x-x0) + v(y-y0)\}] \quad \text{[Equation 3]}$$

i: imaginary unit
x=0gw−1, y=0gh−1, x0=gw/2, y0=gh/2
A: influence region in horizontal direction
B: influence region in vertical direction
$\tan^{-1}(u/v)$: direction of wave, $\sqrt{u^2+v^2}$: frequency In signal detection, Gabor filters each of which has a frequency, a direction of wave, and a size equal to those of a symbol unit embedded in the watermark image and the number of which is equal to the number of types of the embedded signal units are prepared. Gabor filters corresponding to the unit A and unit B in FIG. 3 are called a filter A and a filter B, respectively.

A filter output value at an arbitrary position in the input image is calculated by a convolution between the filters and the image. Since the Gabor filters include real-part filters and imaginary-part filters (the imaginary-part filter is a filter having a phase shifted from the real-part filter by a half wavelength), a mean square of the output values of these filter is set as the filter output value. For example, when the convolution between the real-part filter of the filter A and the image is represented by Rc, and when the convolution between the imaginary-part filter and the image is represented by Ic, an output value F(A) is calculated by the following equation.

$$F(A)=\sqrt{Rc^2+Ic^2} \quad \text{[Equation 4]}$$

Figure 16:
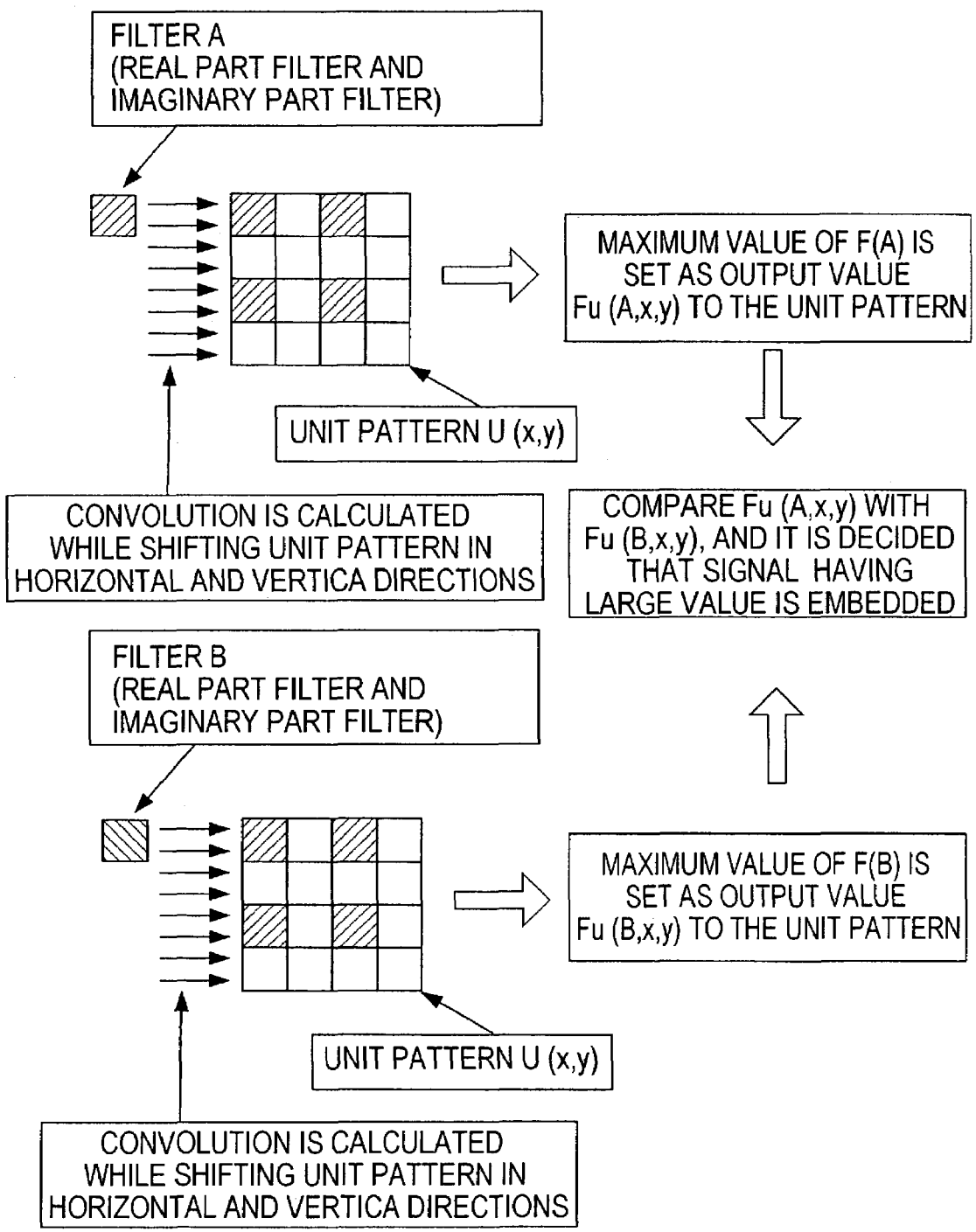
FIG. 16 is a diagram for explaining a method of deciding a symbol unit embedded in a unit pattern U(x,y) as a unit A and a unit B.

FIG. 16 is a diagram for explaining a method of deciding the symbol unit embedded in the unit pattern U(x,y) partitioned in step S303 as the unit A or the unit B.

A symbol decision step for the unit pattern U(x,y) is performed as follows.

(1) While moving the position of the filter A, the maximum value of the values obtained by calculating F(A) for all the positions in the unit pattern U(x,y) is set as an output value of the filter A for the unit pattern U(x,y), and the maximum value is represented by Fu(A,x,y).

(2) An output value of the filter B for the unit pattern U(x,y) is calculated as in (1), and the output value is represented by Fu(B,x,y).

(3) The value Fu(A,x,y) is compared with the value Fu(B,x,y). If Fu(A,x,y)≧Fu(B,x,y) is satisfied, a symbol unit embedded in the unit pattern U(x,y) is decided as the unit A. If Fu(A,x,y)<Fu(B,x,y) is satisfied, the unit symbol embedded in the unit pattern U(x,y) is decided as the unit B.

In (1) and (2), a step width for moving a filter may be arbitrarily set, and only an output value at a typical position on the unit pattern may be calculated. When a difference between Fu(A,x,y) and Fu(B,x,y) in (3) is equal to or smaller than a predetermined threshold value, an impossible decision may be set.

When the maximum value of F(A) exceeds the predetermined threshold value in the process of calculating a convolution while shifting a filter in (1), the symbol unit embedded in the unit pattern U (x,y) may be immediately determined as the unit A, and the process may be stopped. As in (2), when the maximum value of F(B) exceeds a predetermined threshold value, the symbol unit embedded in the unit pattern U(x,y) may be determined as the unit B.

The details of the signal detection (step S304) has been described above. Returning to the flow chart in FIG. 12, the subsequent step S305 will be described below. In step S305, symbols of the unit pattern matrix are connected to each other to reconstruct a data code, and original information is restored.

Figure 17:
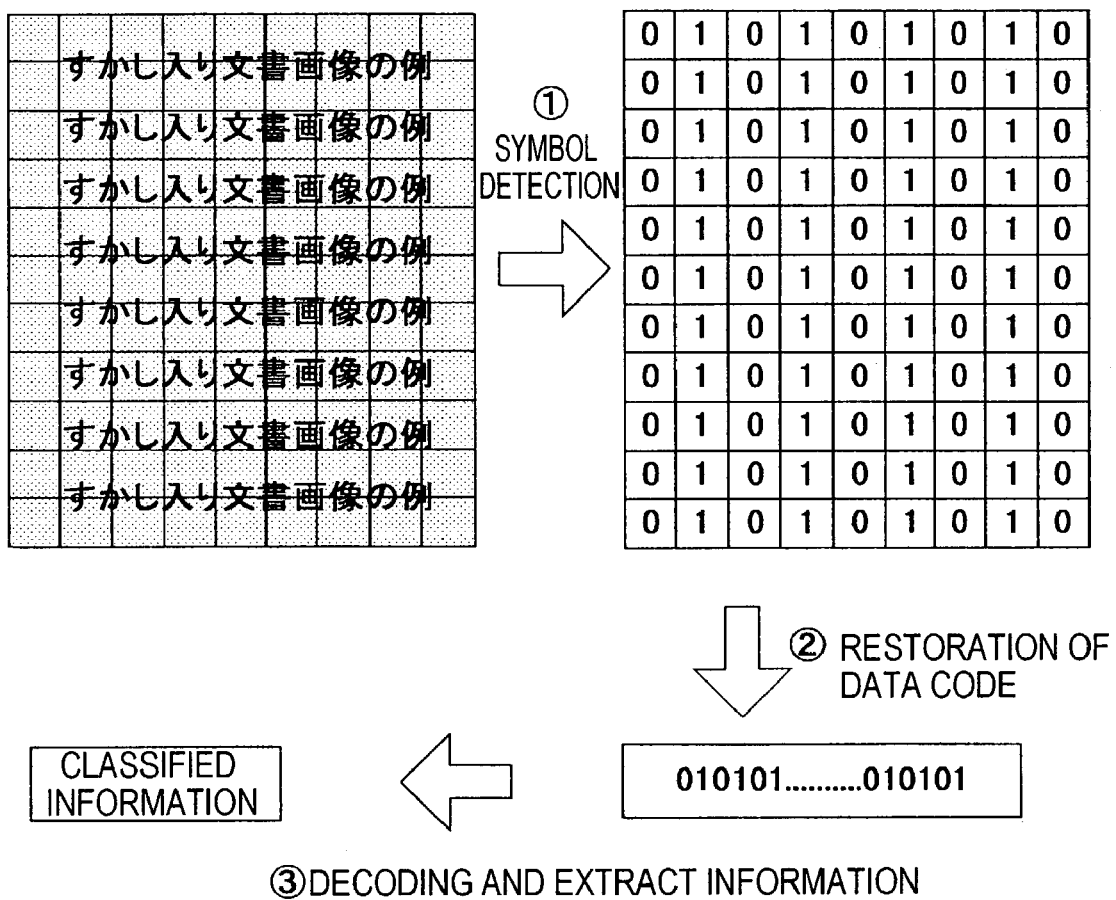
FIG. 17 is a diagram for explaining an example of information restoration.

FIG. 17 is a diagram for explaining an example of information restoration. The step of information restoration is as follows:

(1) A symbol embedded in each unit pattern is detected (FIG. 17(1)).

(2) Symbols are connected to each other to restore a data code (FIG. 17(2)).

(3) A data code is decoded to extract embedded information (FIG. 17(3)).

Figure 18:
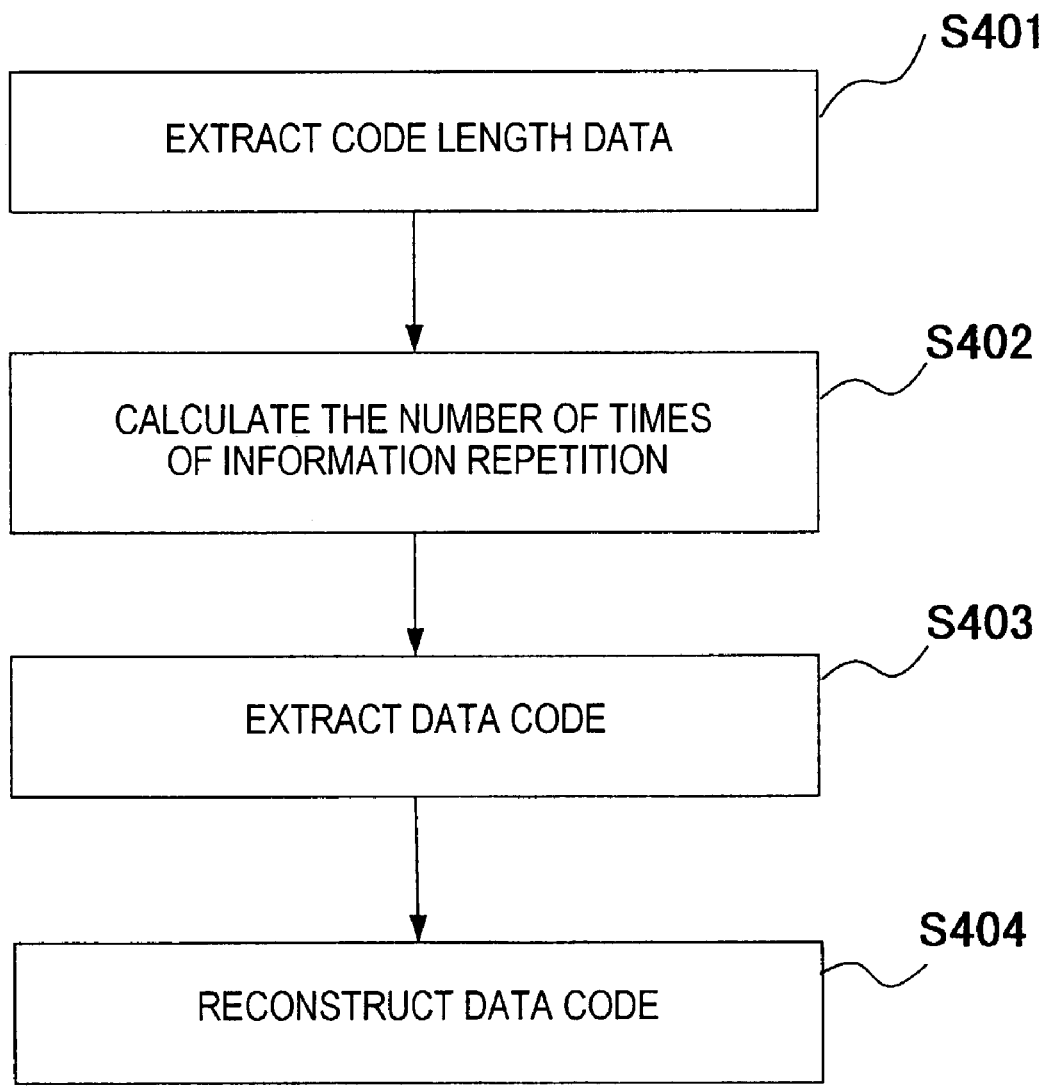
FIG. 18 is a diagram for explaining an example of a method of restoring a data code.
Figure 19:
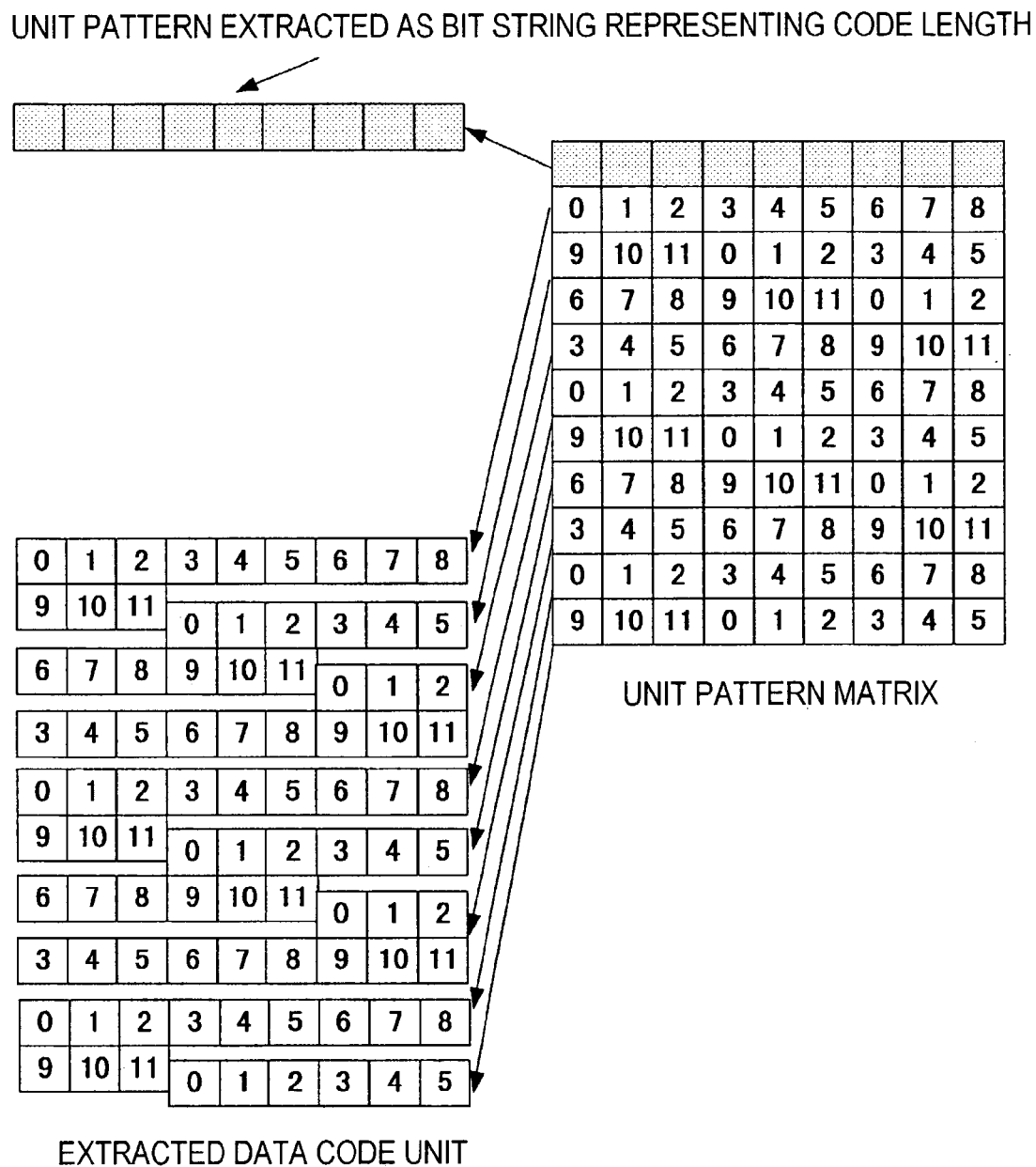
FIG. 19 is a diagram for explaining an example of a method of restoring a data code.
Figure 20:
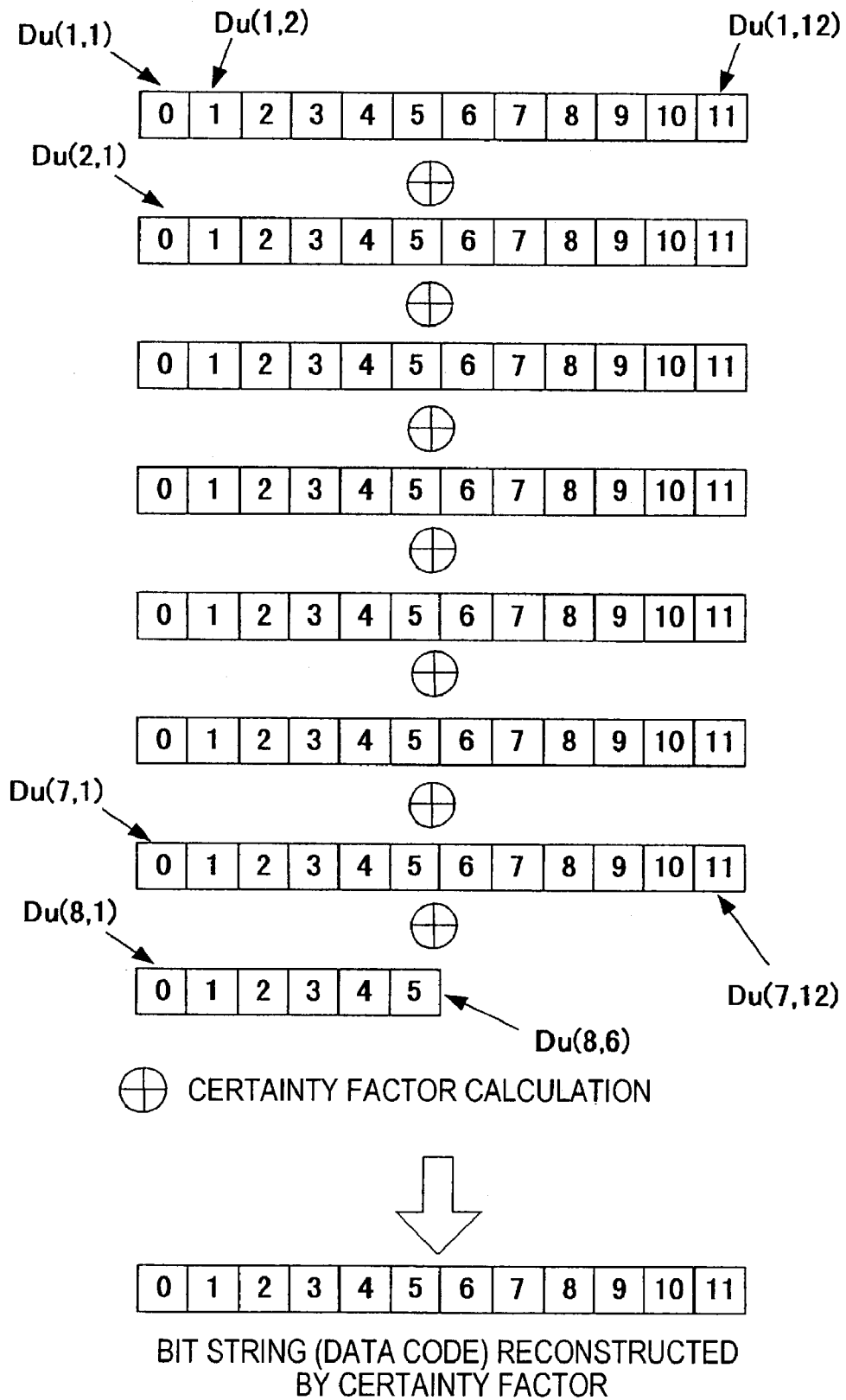
FIG. 20 is a diagram for explaining an example of a method of restoring a data code.

FIGS. 18 to 20 are diagrams for explaining an example of a method of restoring a data code. In this restoring method, processes being opposite to the processes in FIG. 8 are basically performed.

A code length data portion is extracted from the first row of the unit pattern matrix, and the code length of the embedded data code is obtained (step S401).

On the basis the size of the unit pattern matrix and the code length of the data code obtained in step S401, the number of times Dn of embedding of the data code unit and a remainder Rn are calculated (step S402).

The data code unit is extracted from the second and subsequent rows of the unit pattern matrix by a method being opposite to the method in step S203 (step S403). In the example in FIG. 19, the unit pattern matrix is sequentially decomposed into 12 pattern units (U(1,2) to U(3,3), U(4,3) to U(6,4), . . . ) from U(1,2) (second row, first column). Since Dn=7 and Rn=6, the 12 pattern units (data code units) are extracted seven times. As remainders, 6 (corresponding to the upper 6 data code units) unit patterns (U(4,11) to U(9,11)) are extracted.

A bit certainty calculation is performed to the data code units extracted in step S403, so that the embedded data codes are reconstructed (step S404). A bit certainty calculation will be described below.

The data code units which are extracted from the second row and the first column of the unit pattern matrix at the first as shown in FIG. 20 are expressed as Du(1,1) to Du(12,1). These data code units are sequentially expressed as Du(1,2) to Du(12,2), . . . . In addition, the remainder parts are expressed as Du(1,8) to Du(6,8). A bit certainty calculation is decided each element of the respective data code units by a majority decision performed, so that the values of symbols of the data codes are determined. In this manner, even though signal detection cannot be correctly performed from an arbitrary unit in an arbitrary data code unit due to overlapping between the units and a character area, stain on a paper surface, and the like (bit inversion error or the like), data code can be conclusively and correctly restored.

More specifically, for example, the first bit of the data code is decided as 1 when a signal detection result of Du(1,1), Du(1,2), . . . , Du(1,8) is often 1, and the first bit is decided as 0 when the signal detection result is often 0. Similarly, the second bit of the data code is decided by a majority decision performed by a signal detection result of Du(2,1), Du(2,2), . . . , Du(2,8). The 12th bit of the data code is decided by a majority decision performed by a signal detection result of Du (12,1), Du(12,2), . . . , Du(12,7) (up to Du(12,7) because Du(12,8) is not present).

A bit certainty calculation can also be performed by adding output values of the signal detection filters in FIG. 16. For example, it is assumed that symbol 0 is allocated to the unit A in FIG. 3(1), that symbol 1 is allocated to the unit B in FIG. 3(2), that the maximum value of output values obtained by the filter A to Du(m,n) is represented by Df(A,m,n), and that the maximum value of output values obtained by the filter B to Du(m,n) is represented by Df(B,m,n), the Mth bit of the data code is decided as 1 when $$\sum_{n=1}^{Dn} Df(A, M, n) \geq \sum_{n=1}^{Dn} Df(B, M, n)$$ [Equation 5]

is satisfied. The Mth bit is decided as 0 when the equation is not satisfied. However, N<Rn is satisfied, the addition of Df is performed up to n=1 to Rn+1.

The case in which the data codes are repeatedly embedded has been described above. However, when an error correction code or the like is used when data is coded, a method which does not perform repetition of the data code units can also be realized.

As has been described above, according to this embodiment, the following excellent effects can be obtained.

(1-1) Since embedded information is expressed by changing arrangements of dots, the font of an original document and pitches between characters and lines are not changed.

(1-2) Since a dot pattern to which a symbol is allocated has a density (the number of dots in a predetermined zone) equal to the density of a dot pattern to which no symbol is allocated, it seems that the background of a document is hatched at a uniform density, and the presence of information is not conspicuous.

(1-3) A dot pattern to which a symbol is allocated and a dot pattern to which no symbol is allocated are concealed from the third party, so that embedded information cannot be easily decoded.

(1-4) Patterns expressing information are aggregates of small dots and embedded in the entire surface as the background of the document. For this reason, even though a embedding algorithm is disclosed, information embedded in the printed document cannot be easily altered.

(1-5) A embedded signal is detected by a difference between directions of wave (change in thickness) (because detailed detection in units of pixels is not performed). For this reason, even though the printed document is slightly stained, stable information detection can be performed.

(1-6) The same pieces of information are repeatedly embedded, and all the pieces of repeatedly embedded information are used to restore the information in detection. For this reason, if a signal part is concealed by a character of a large font, or if the information is partially lost by stain on a sheet of paper, the embedded information can be stably extracted.

SECOND EMBODIMENT

In the document output section according to the first embodiment, data to be inserted into a printed matter as a watermark is converted into a code (this code may be encrypted) by using an error correction code or the like. For example, the data is converted into a binary code, the data is expressed by a bit string consisting of 0 and 1. Dot patterns which express symbols correspond to the symbols (symbol 1, symbol 2). Although the dot patterns are embedded as a background of a document image, when the number of bits (the number of elements of a dot pattern arrangement) of a code is smaller than the maximum number of signals which can be embedded in one sheet of paper, the dot pattern arrangement is repeatedly embedded on the paper surface.

Since the watermark signals are embedded as the background of the document image, a dot pattern cannot be detected in signal detection from a position where some or all of the dot patterns which express signals overlap the character area of the document image. As described in the first embodiment, in the signal detection, a decision whether each bit of a code is 0 or 1 is performed by a method such as a majority decision performed by checking whether a dot pattern detected from a position corresponding to each bit is 0 or 1. Therefore, when positions (region overlapping the character area) where dot patterns cannot be detected are concentrated on a certain bit of the code, the bit cannot be decided as shown in FIG. 21. Even though an error correction code is used as the code, information cannot be restored when the number of bits which cannot be decided is larger than the number of bits which can be processed by the error correction.

Figure 22:
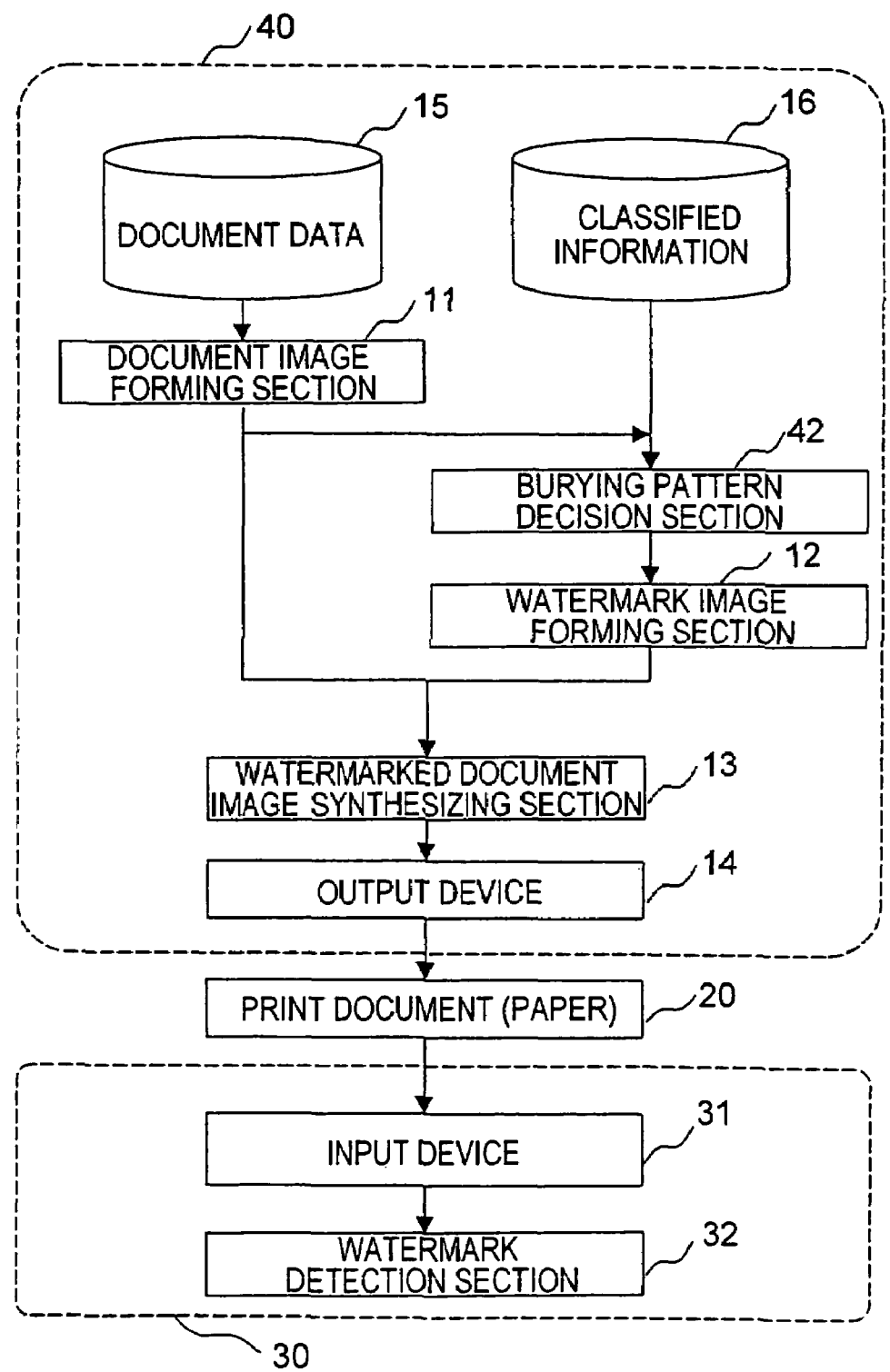
FIG. 22 is a diagram for explaining the configurations of a watermark information embedding device and a watermark information detection device according to the second embodiment.

FIG. 22 is a diagram for explaining the configurations of a watermark information embedding device and watermark information detection device according to this embodiment. The second embodiment is different from the first embodiment in that a embedding pattern decision section 42 is added to a watermark information embedding device 40. The embedding pattern decision section 42 is a section for determining an order of watermark signals arranged on a paper surface.

Since the other constituent elements are the same as those in the first embodiment, the overlapping explanations will be omitted. The operation of this embodiment will be described below with focus on items added to the first embodiment.

Figure 23:
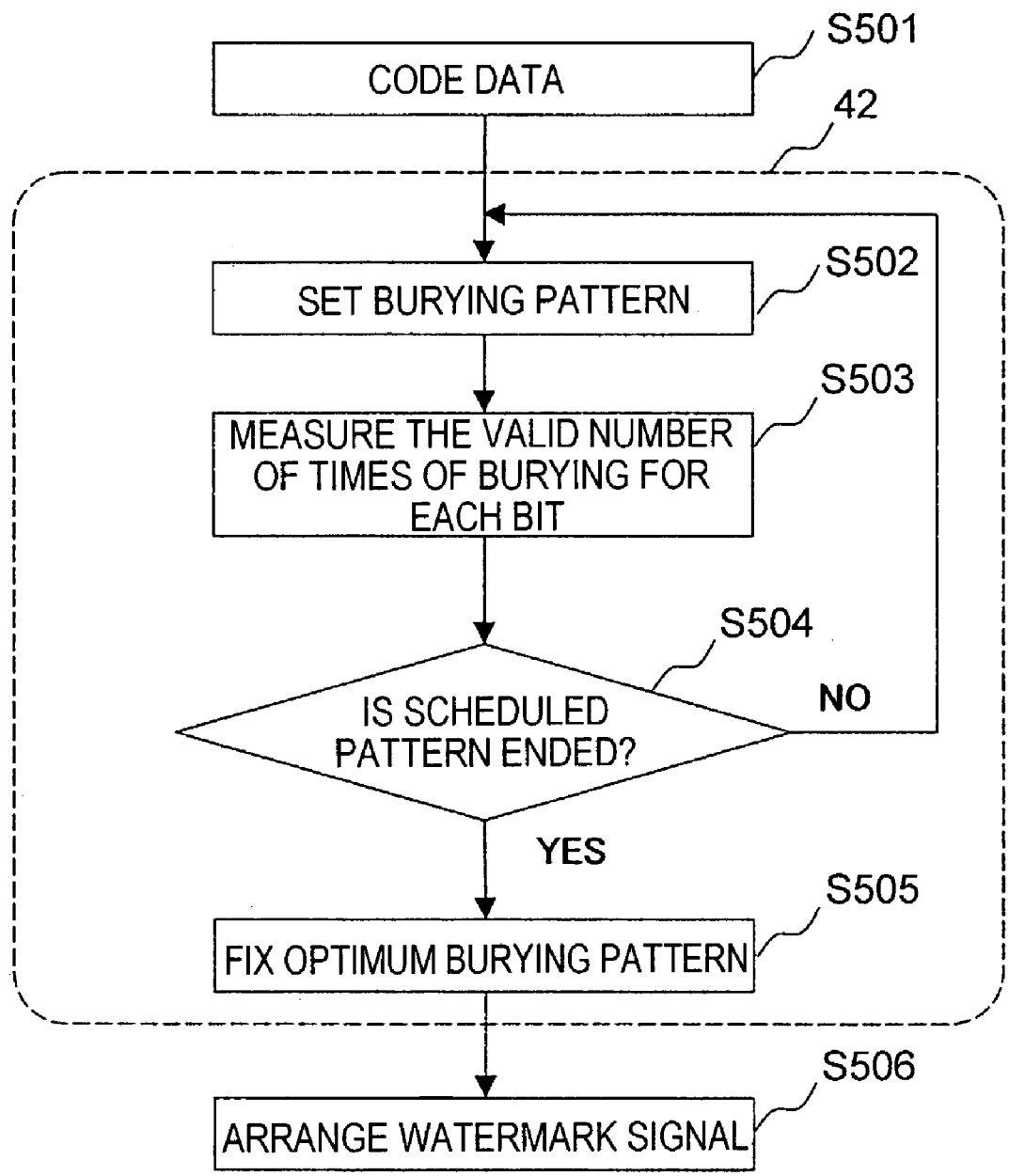
FIG. 23 is a flow chart showing a flow of processes of a embedding pattern decision section 42.

FIG. 23 shows a flow of processes of the embedding pattern decision section 42 and the watermark image forming section 12. An area surround by a broken line (steps S501 to S505) is a part corresponding to the processes performed by the embedding pattern decision section 42.

In the outline of the embedding pattern decision section 42, signal-embedded patterns of Np types are prepared in advance. When the signals are embedded depending on the respective embedding patterns before the signals are actually arranged, a rate of concentration of positions where the signals overlap characters on a specific bit is determined. Embedding patterns are selected such that the positions where the signals overlap the characters are most widely diffused on all the bits of the code.

When the code length is represented by L, and when the number of signals which do not overlap the character in signals (dot pattern) which can be embedded in the document is represented by N, an average V of the valid number of times of embedding of the bits of the code (the number of times of embedding which can be performed without overlapping the signals and the character) is represented by N/L. Therefore, ideally, a embedding pattern which can be arranged in a region in which all the bits of the code do not overlap the character V times each is the optimum pattern. As described above, the valid numbers of times of embedding are biased, a bit in which signals can be embedded a small number of times, the possibility that the signals cannot be read due to a signal detection error, stain on a paper surface subjected to printing, new writing on the paper size, or the like in signal reading is high. When the numbers of times are largely biased, some bits are not adversely affected by stain or writing, and the signals cannot be read from a large number of bits. Therefore, all the bits of the code have values equal to the average of the valid number of times of embedding. More specifically, a pattern having a minimum variance (or standard deviation) of the numbers of times of embedding of the bits is selected.

In step S501, data to be inserted into a printed matter as a watermark is converted into a code (the code may be encrypted) by using an error correction code or the like. For example, the data is converted into a binary code, the data is expressed by a bit string consisting of 0 and 1. A dot pattern which expresses a symbol (symbol 0 or symbol 1) corresponds to the symbol.

In steps S502 to S504, embedding patterns of Np types (step S502), cases in which the bits of a code to be embedded overlap a character area are counted in units of bits (step S503).

Figure 24A:
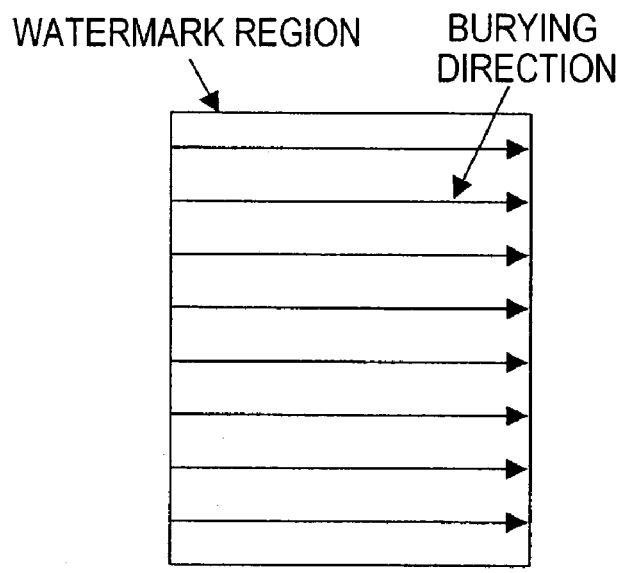
Figure 24B:
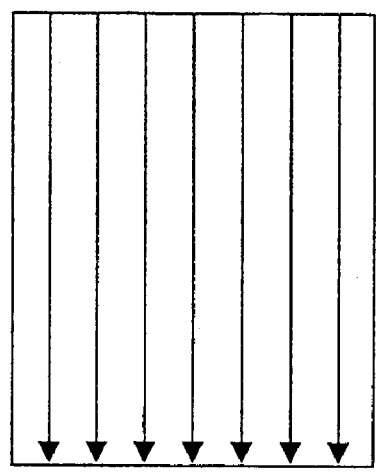
Figure 24C:
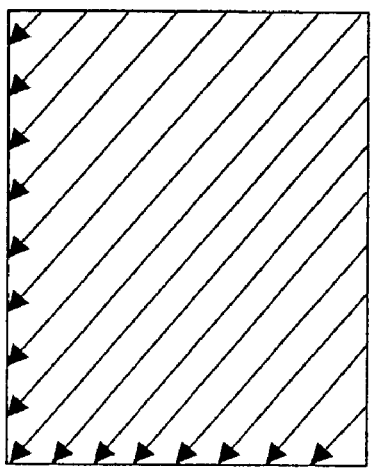
Figure 24D:
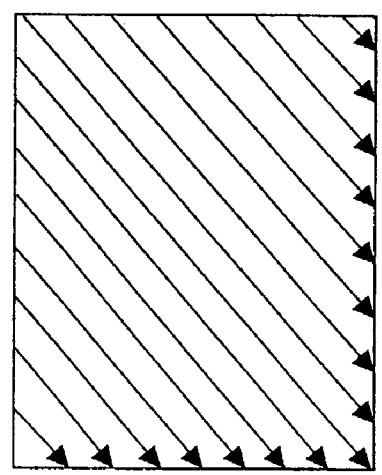
Figure 25:
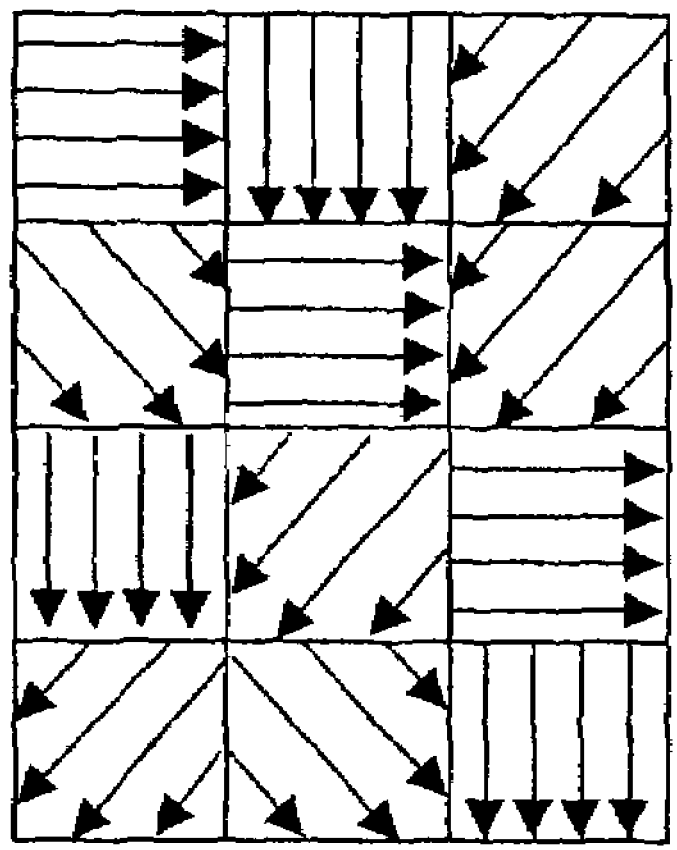
FIG. 25 is a diagram for explaining a case in which a document image is divided into regions.

FIGS. 24A to 24D are examples of embedding patterns of four types (Np=4). In FIG. 24A, signals are continuously embedded in a horizontal direction. In FIG. 24B, signals are continuously embedded in a vertical direction. In FIGS. 24C and 24D, signals are embedded in oblique directions. In addition, an infinite number of embedding patterns such as a spiral embedding pattern can be conceivable. Furthermore, as shown in FIG. 25, a document image is divided into some blocks, and different embedding patterns may be used in the blocks, respectively.

Figure 26:
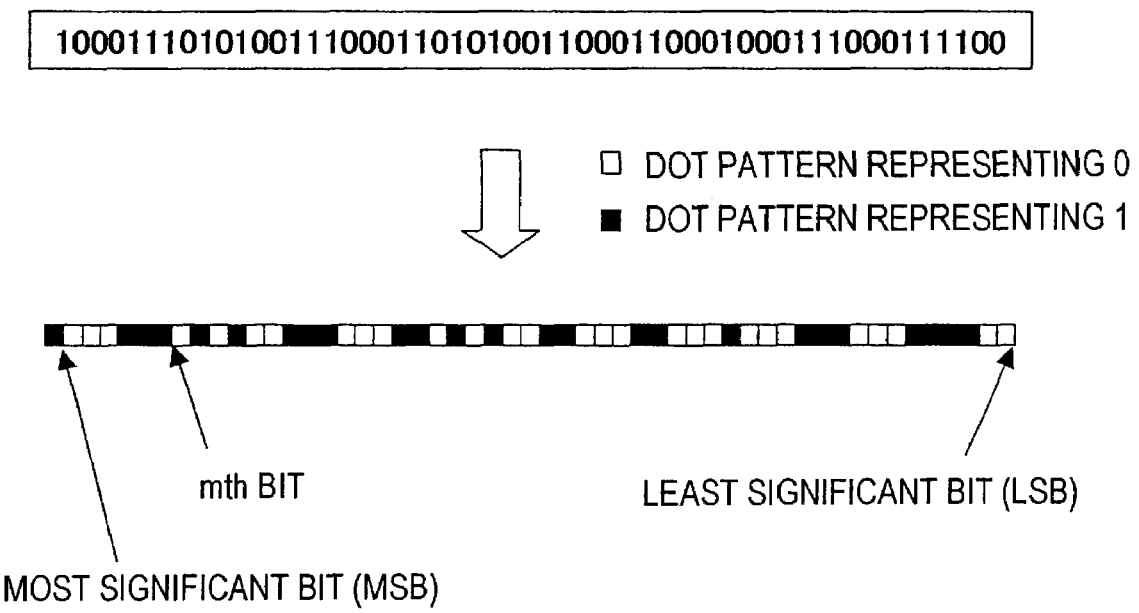
FIG. 26 is a diagram for explaining an example of a code and an example of dot patterns arranged on the basis of the code.

FIG. 26 shows an example of a code and an example of an arrangement of dot patterns based on the code. These dot patterns are repeatedly arranged as a background of a document image.

Figure 27A:
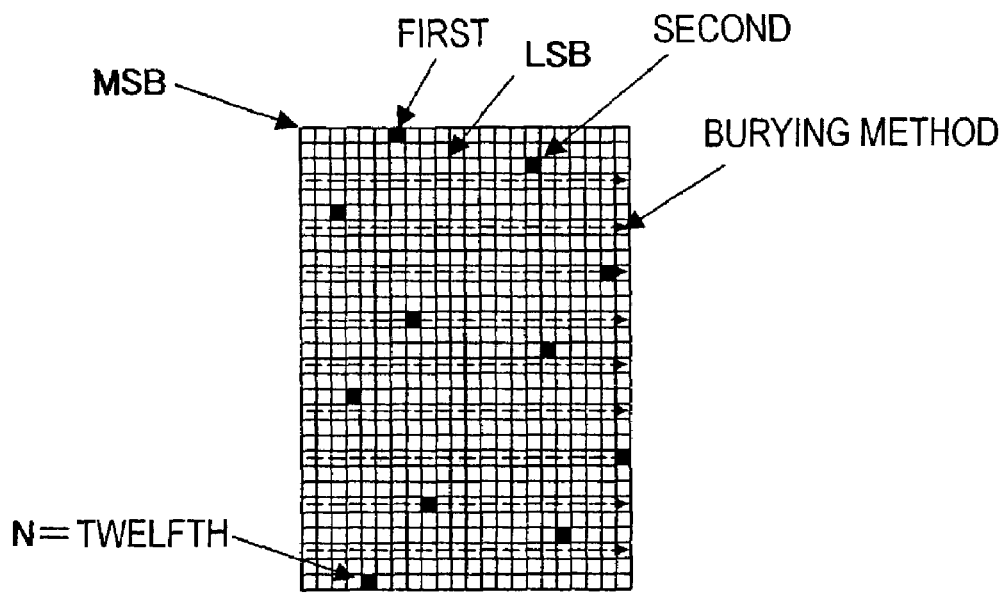
FIGS. 27A and 27B are diagrams for explaining examples of the codes of FIG. 6 arranged according to the embedding pattern in FIG. 24A.
Figure 27B:
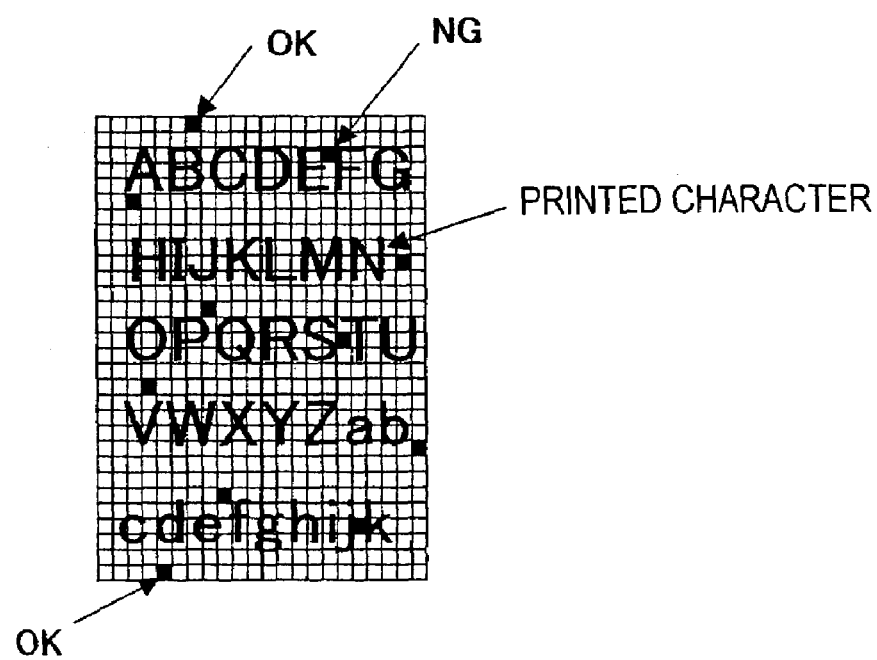

FIG. 27A shows an example in which the code in FIG. 26 is arranged according to the embedding pattern in FIG. 24A. The dot pattern of the mth bit in FIG. 26 is embedded 12 times. In FIG. 27B, printed characters overlap the foreground of the dot patterns. As in FIG. 27B, although the mth bit of the code does not overlap a character in the first arrangement, the mth bit overlaps the character in the second arrangement. With respect to the embedding patterns in FIGS. 24A to 24D, the number of cases in which the mth bit of the code can be arranged without overlapping a character is expressed by N(P,m). A sum T(P) of the valid numbers of embedding of the bits of the code is obtained by adding N(P,m) while changing m from 1 to L. An average valid number of times of embedding E(P) is given by T(P)/L. In this manner, the variance of the valid number of times of embedding can be calculated by:

$$V(P)=E\{(E(P)-N(P,m))^2\}$$

V(P) is calculated for all the embedding patterns, and a embedding pattern having the minimum V(P) is fixed as a pattern to be embedded in the document image in step S505.

Figure 28:
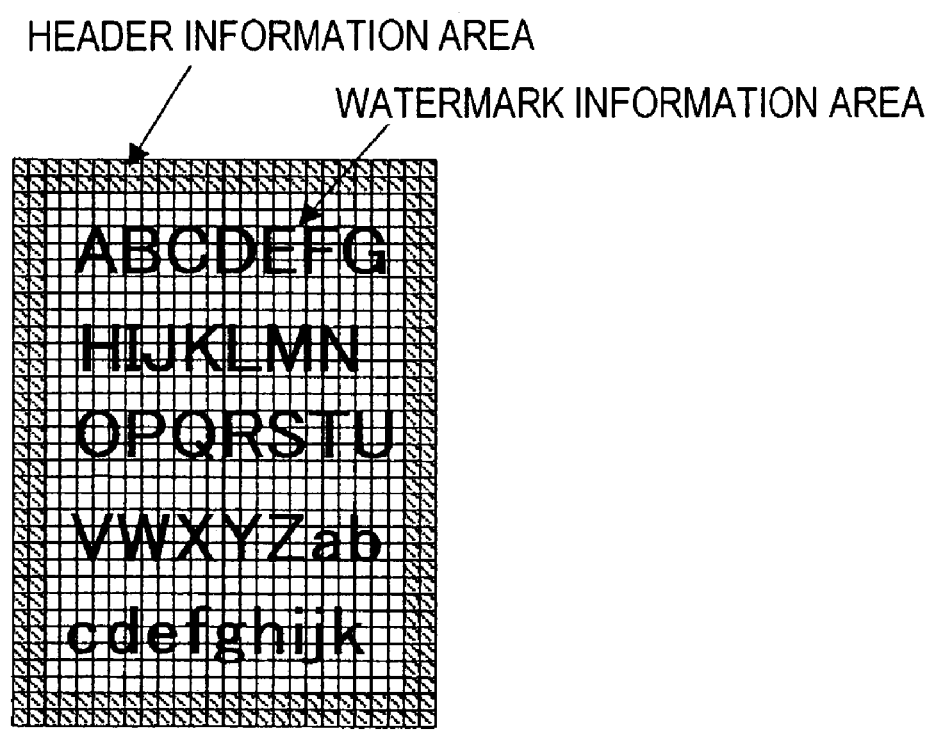
FIG. 28 is a diagram for explaining a header information area and a watermark information area.

In step S506, watermark signals are arranged according to the embedding pattern fixed in step S505 and overlapped on the document image. At this time, as shown in FIG. 28, information representing a embedding pattern used when the watermark signals are embedded is simultaneously embedded in a header information area as shown in FIG. 28. It is assumed that pieces of information are arranged in the header information area according to a predetermined embedding pattern regardless of a document.

The watermark detection section 32 will be described below.

Figure 29:
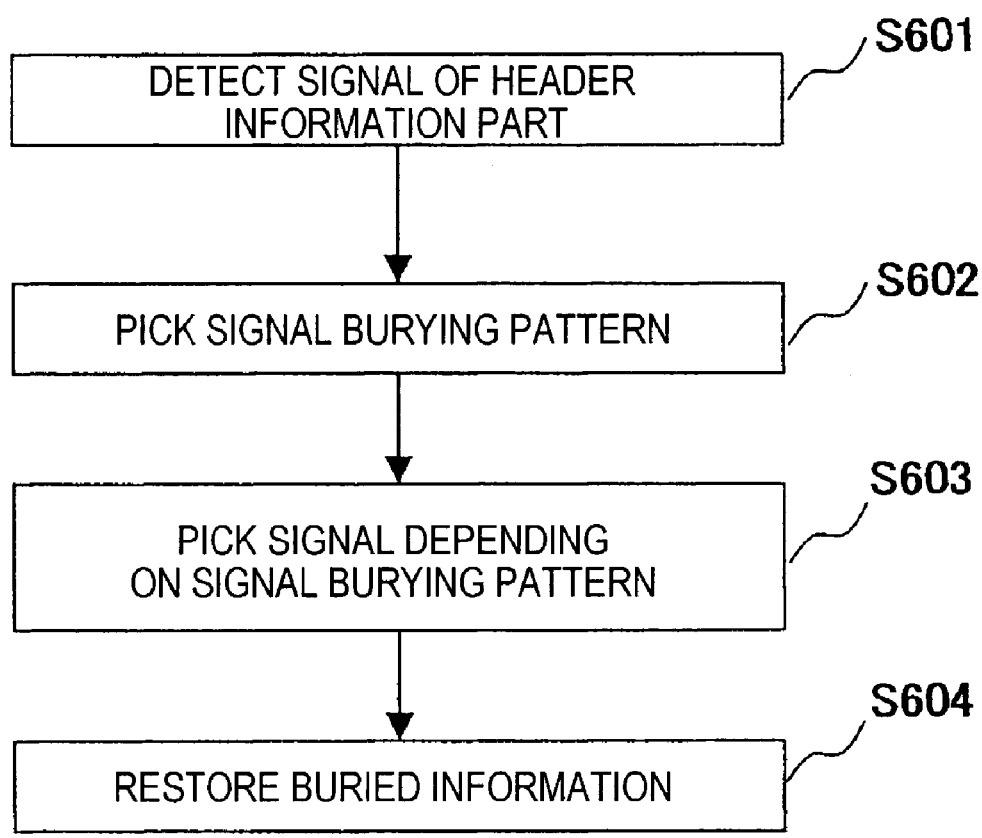
FIG. 29 is a flow chart showing a flow of processes of the watermark detection section 32.

FIG. 29 shows a flow of processes performed by the watermark detection section 32.

In step S601, a signal of a part in which header information is embedded is detected in the input image, and the header information is restored.

In step S602, a signal embedding pattern is extracted from the header information restored in step S601.

In step S603, the watermark signals are read according to the embedding pattern extracted in step S602.

In step S604, a majority decision is performed for each bit of the code, the values of the bits are fixed, and codes are decoded to extract information.

In step S506 in FIG. 23, the embedding pattern is recorded in the header information embedding area. However, if embedding patterns are disclosed, and if the embedding patterns are limited to embedding patterns of several types, information is decoded by all the patterns in detection without recording the embedding patterns, so that the information which can be correctly decoded (a decoding error does not occur, or significant information can be extracted) can be extracted as watermark information.

Even though the embedding patterns are concealed, the embedding pattern need not be recorded for the following reason. When the watermark information is classified information, embedding patterns are complicated, the types of embedding patterns are not disclosed, and a pattern in which signals are embedded is concealed to maintain higher security. When the device is used to achieve such an object, the processes in steps S502 to S505 need not be performed.

Block division (FIG. 25) of a embedding pattern is supplementarily described below. When a document image is divided into several blocks as one of signal embedding blocks, and when different embedding patterns are applied to the blocks, respectively, not only a method of dividing the document image into blocks each having a fixed size but also the following method may be used as a method of dividing a document image into blocks as shown in FIG. 23.

When it is assumed that the embedding pattern (FIG. 24A) in which signals are continuously embedded in the horizontal direction is employed for a document for horizontal writing, a region which overlaps characters continues to some extent. For this reason, depending on a code length, the state of impossible decision shown in FIG. 21 easily occurs. When the embedding pattern in which signals are continuously embedded in the vertical direction (FIG. 24(B)) is employed for a document for vertical writing, the same state easily occurs.

Figure 30:
FIG. 30 is a diagram for explaining an example of a document in which vertical writing, horizontal writing, graphics, and the like are mixed.

FIG. 30 shows an example of a document in which vertical writing, horizontal writing, graphics, and the like are mixed. In this document, a variance of the valid numbers of times of embedding of the bits of a code is smaller in a case in which a document is divided into some blocks, and different embedding patterns are applied to the blocks, respectively, than in a case in which one embedding pattern is applied to an entire document as shown in FIGS. 24A to 24D. As a dividing method, a method of dividing an image into block each having a fixed size as described above may be used. However, when dynamic division is performed by analyzing the characteristics of a document image, an effect of a reduction in variance is improved.

Figure 31A:
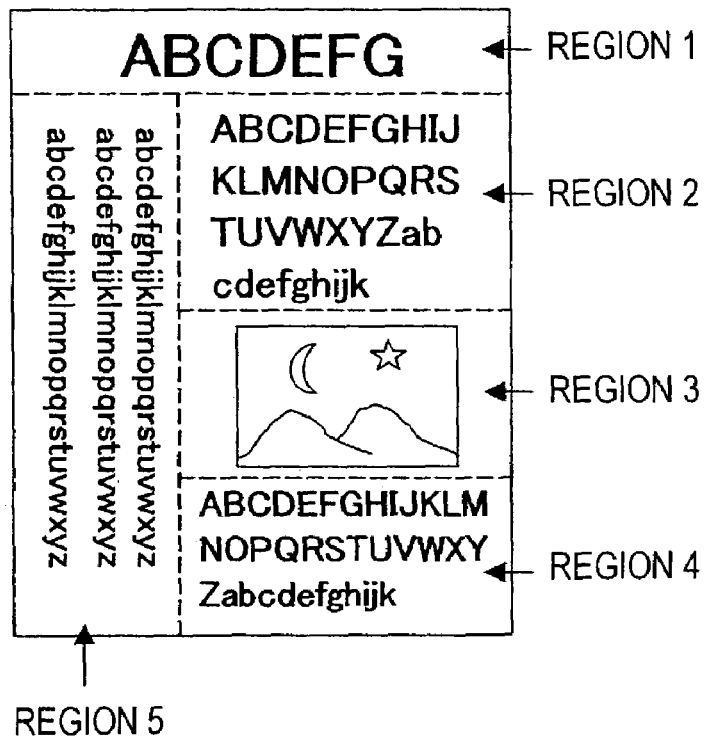

FIG. 31(A) shows an example in which the document in FIG. 30 is divided by characteristics such as vertical writing, horizontal writing, and the like. This division may be performed by using a method such as "Table Analysis of OCR (Japanese Patent Laid-Open Publication No. 04-033079)" used as a pre-process for OCR. In addition, the document image in FIG. 30 is reduced in size, an aggregate of character areas each having a certain size is extracted, and this aggregate may be divided into one block. In the example in FIG. 31(A), region 1, region 2, and region 4 are regions including horizontal character strings, region 5 is a region including vertical character strings, and region 3 is a region including a graphic.

Figure 31B:
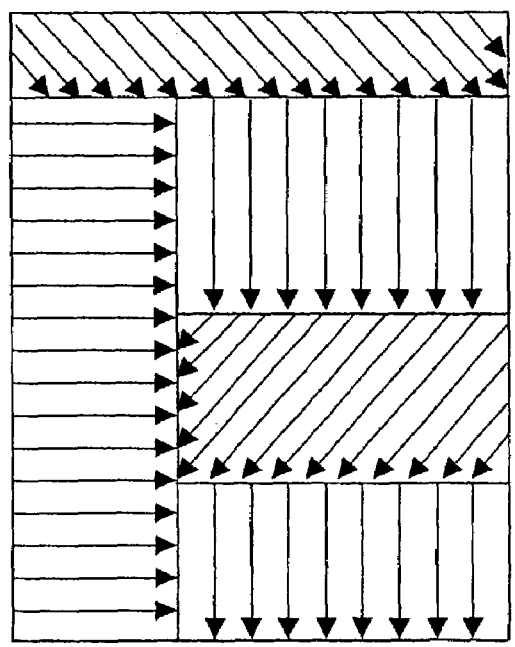

The processes in steps S502 to S505 in FIG. 23 are performed for each of these regions, and embedding patterns for the regions are determined. FIG. 31(B) shows an example in which optimum embedding patterns are applied to the regions, respectively.

Information representing how to divide a document image and information of embedding patterns for respective regions may be recorded in the header information area in FIG. 28, or may be defined as classified information.

A signal is not easily embedded in a graphic region in the document image. For this reason, when the document image is divided into the regions as shown in FIG. 31(A), a signal is not embedded in a region which is decided as a graphic region, and information representing that a signal is not embedded in the graphic region may be recorded in the header information area. When a signal is not embedded in the graphic region, the process of performing signal detection in a region in which signals are not originally embedded in watermark detection can be omitted. Therefore, a processing time can be shortened, and a signal detection error can be prevented.

As described above, according to this embodiment, the following excellent advantages can be obtained.

(2-1) When information is embedded in a background of a sheet of paper with small dot patterns and a method which is visually comfortable, signals which cannot be detected due to overlapping between a character area of a foreground and a dot pattern are not concentrated on some bits of a code expressing information. For this reason, the information can be reliably extracted even though a detection error in signal detection, deterioration such as stain of a sheet of paper, or overwriting on the sheet of paper occurs.

(2-2) When a embedding pattern of signals is concealed, only a person who knows the embedding pattern can extract information, and a risk that the embedded information is underlooked by the third party bearing ill will can be reduced.

(2-3) A document image is divided into regions in units of characteristics of constituent elements, and optimum signal embedding patterns are applied to the divided regions, respectively, so that the advantage of (2-1) can be more improved.

(2-4) A document image is divided into regions in units of characteristics of constituent elements, and signals are not embedded in a part such as a graphic region in which signals are rarely able to be embedded. Therefore, a processing time in watermark detection can be reduced, and detection errors can be reduced in number.

The preferred embodiments of the watermark information embedding device and the watermark information detection device according to the present invention have been described with reference to the accompanying drawings. However, the present invention is not limited to these embodiment. It is apparent that a person skilled in the art can think of various changes and modifications in the category of technical idea described in the spirit and scope of the invention. It is understood that these changes or modifications belong to the spirit and scope of the invention as a matter of course.

As has been described above, according to the present invention, the following excellent advantages are obtained.

(1-1) Since embedded information is expressed by a difference between the arrangements of dots, the font of an original document and pitches between characters and between lines are not changed.

(1-2) Since a dot pattern to which a symbol is allocated has a density (the number of dots in a predetermined zone) which is equal to the density of a dot pattern to which a symbol is not allocated, it seems that the background of a document is hatched at a uniform density, and the presence of information is not conspicuous.

(1-3) A dot pattern to which a symbol is allocated and a dot pattern to which no symbol is allocated are concealed from the third party, so that embedded information cannot be easily decoded.

(1-4) Patterns expressing information are aggregates of small dots and embedded in the entire surface as the background of the document. For this reason, even though a embedding algorithm is disclosed, information embedded in the printed document cannot be easily altered.

(1-5) A embedded signal is detected by a difference between directions of wave (change in thickness) (because detailed detection in units of pixels is not performed). For this reason, even though the printed document is slightly stained, stable information detection can be performed.

(1-6) The same pieces of information are repeatedly embedded, and all the pieces of repeatedly embedded information are used to restore the information in detection. For this reason, if a signal part is concealed by a character of a large font, or if the information is partially lost by stain on a sheet of paper, the embedded information can be stably extracted out.

According to the present invention, the following excellent advantages are obtained.

(2-1) When information is embedded in a background of a sheet of paper with small dot patterns and a method which is visually comfortable, signals which cannot be detected due to overlapping between a character area of a foreground and a dot pattern are not concentrated on some bits of a code expressing information. For this reason, the information can be reliably extracted even though a detection error in signal detection, deterioration such as stain of a sheet of paper, or overwriting on the sheet of paper occurs.

(2-2) When a embedding pattern of signals is concealed, only a person who knows the embedding pattern can extract information, and a risk that the embedded information is underlooked by the third party bearing ill will can be reduced.

(2-3) A document image is divided into regions in units of characteristics of constituent elements, and optimum signal embedding patterns are applied to the divided regions, respectively, so that the advantage of (2-1) can be more improved.

(2-4) A document image is divided into regions in units of characteristics of constituent elements, and signals are not embedded in a part such as a graphic regions in which signals are rarely able to be embedded. Therefore, a processing time in watermark detection can be reduced, and detection errors can be reduced in number.

What is claimed is:

1. A watermark information embedding device comprising:
   a document image forming section for forming a document image in units of pages on the basis of document data;
   a watermark image forming section for forming a watermark image in which dot patterns of a plurality of types are regularly arranged, and classified information is assigned to at least one type of dot pattern;
   a watermarked image synthesizing section for overlapping the document image and the watermark image to form a watermarked document image, and
   a pattern deciding section for selecting a specific embedding pattern in which the dot patterns are arranged so as to reduce obscuring, by the document image, of the dot patterns to which classified information is assigned,
   wherein the pattern deciding section changes at least two embedding patterns of the dot patterns to temporarily arrange the dot patterns,
   wherein the pattern deciding section selects the embedding pattern depending on a valid number of dot patterns which can be detected even though the document image and the watermark image are overlapped, and
   wherein the pattern deciding section, with respect to the at least two embedding patterns which are temporarily arranged, calculates variances of the valid numbers of dot patterns and selects the embedding pattern having the minimum variance.

2. A watermark information embedding device according to claim 1, wherein
   the pattern deciding section divides the document image into regions and selects the embedding patterns optimum for the divided regions.

3. A watermark information embedding device according to claim 2, wherein
   the pattern deciding section performs a characteristic recognition process on the document image to perform region division depending on the characteristics of the document image, the characteristics including whether vertical text is present, whether horizontal text is present, and whether a graphic is present.

4. A watermark information embedding device comprising:
   a document image forming section for forming a document image in units of pages on the basis of document data;
   a watermark image forming section for forming a watermark image in which dot patterns of a plurality of types are regularly arranged, and classified information is assigned to at least one type of dot pattern;
   a pattern deciding section for selecting a specific embedding pattern in which the dot patterns are arranged in the watermark image;
   a watermarked image synthesizing section for overlapping the document image and the watermark image to form a watermarked document image,
   wherein the pattern decision section divides the document image into regions and selects embedding patterns optimum for the divided regions,
   wherein the pattern decision section performs a characteristic recognition process on the document image to perform region division depending on the characteristics of the document image,
   wherein the pattern deciding section does not arrange the dot patterns in a divided region in which the dot pattern cannot be substantially arranged as a result of the characteristic recognition process for the document image, and
   wherein information related to the divided region in which the dot pattern is not arranged is embedded in the watermarked document image as header information.

* * * * *